(12) United States Patent
Tobey et al.

(10) Patent No.: US 7,789,175 B2
(45) Date of Patent: Sep. 7, 2010

(54) MODULAR DUAL WHEEL DRIVE ASSEMBLY, WHEELED DEVICES THAT INCLUDE MODULAR DUAL WHEEL DRIVE ASSEMBLIES AND METHODS FOR MOVING AND/OR MANEUVERING WHEELED DEVICES USING MODULAR DUAL WHEEL DRIVE ASSEMBLIES

(75) Inventors: Wayland E. Tobey, Mazomanie, WI (US); Peter D. Davis, Oregon, WI (US)

(73) Assignee: Cycogs, LLC, Sauk City, WI (US)

( * ) Notice: Subject to any disclaimer, the term of this patent is extended or adjusted under 35 U.S.C. 154(b) by 1133 days.

(21) Appl. No.: 11/247,652

(22) Filed: Oct. 11, 2005

(65) Prior Publication Data

US 2007/0080000 A1     Apr. 12, 2007

(51) Int. Cl.
*B60K 1/00* (2006.01)
(52) U.S. Cl. .................... 180/65.1; 180/65.51; 180/264; 180/6.48
(58) Field of Classification Search ................. 180/65.1, 180/65.5, 6.2, 6.66, 6.48, 237, 264
See application file for complete search history.

(56) References Cited

U.S. PATENT DOCUMENTS

| | | | |
|---|---|---|---|
| 3,197,229 A | 7/1965 | Houlton | |
| 3,280,931 A | 10/1966 | Cahill et al. | |
| 3,645,406 A | 2/1972 | Brazell | |
| 3,827,517 A * | 8/1974 | Williamson | ................. 180/6.48 |
| 4,003,447 A | 1/1977 | Weyer | |
| 4,573,548 A | 3/1986 | Holland | |
| 4,599,030 A | 7/1986 | Skaalen et al. | |
| 4,657,104 A | 4/1987 | Holland | |
| 5,116,291 A * | 5/1992 | Toyosumi et al. | ............ 475/178 |
| 5,165,838 A | 11/1992 | Kallansrude et al. | |
| 5,199,524 A * | 4/1993 | Ivancic | ....................... 180/237 |
| 5,609,216 A | 3/1997 | Fisher et al. | |
| 5,618,151 A | 4/1997 | Rosenkranz | |
| 5,624,004 A * | 4/1997 | Watanabe | ................... 180/168 |

(Continued)

OTHER PUBLICATIONS

"Development of a holonomic mobile robot for mobile manipulation tasks", by R. Holmberg et al., FSR'99 International Conference on Field and Service Robots, Pittsburg, PA, Aug. 1999, pp. 1-6.

*Primary Examiner*—S. Joseph Morano
*Assistant Examiner*—Katy Meyer
(74) *Attorney, Agent, or Firm*—Lathrop & Clark LLP

(57) ABSTRACT

A wheel assembly for a small-scale machine includes a pair of opposing, individually-driven wheels, associated motors and possibly one or more gear assemblies. The motors receive separate drive signals from a control electronics subsystem of the wheel assembly. The motors can be connected to the wheels via the gear assemblies. Because the wheels are separately driven, driving the two wheel assemblies at similar or different speeds drives the wheel assembly over straight or curved paths. An orientation assembly allows the orientation of the wheels to the machine to be controllably altered. A height adjusting assembly allows the distance between the wheels and a point on the machine where the wheel assembly is attached to be adjusted. The rotational axis that the wheel assembly rotates about when re-oriented need not pass through either wheel of the wheel assembly. The wheels can be driven by control signals generated by on-board control electronics.

20 Claims, 13 Drawing Sheets

U.S. PATENT DOCUMENTS

| | | |
|---|---|---|
| 6,328,123 B1 | 12/2001 | Niemann |
| 6,491,127 B1 * | 12/2002 | Holmberg et al. ........... 180/252 |
| 6,540,039 B1 * | 4/2003 | Yu et al. .................... 180/253 |
| 6,853,877 B1 | 2/2005 | Slater et al. |
| 7,137,470 B2 * | 11/2006 | Gotz .......................... 180/264 |
| 2002/0089107 A1 * | 7/2002 | Koh ........................... 267/218 |
| 2002/0175009 A1 | 11/2002 | Kress |

\* cited by examiner

MODULAR DUAL WHEEL DRIVE ASSEMBLY, WHEELED DEVICES THAT INCLUDE MODULAR DUAL WHEEL DRIVE ASSEMBLIES AND METHODS FOR MOVING AND/OR MANEUVERING WHEELED DEVICES USING MODULAR DUAL WHEEL DRIVE ASSEMBLIES

BACKGROUND OF THE INVENTION

1. Field of the Invention

This invention is directed to drive assemblies for self-propelled wheeled devices.

2. Related Art

Devices or machines having self-propelled wheels typically occupy two distinct points along the size spectrum. At one end of the side spectrum lie the "mega machines" or "monster machines", as they are commonly referred to in the media. These large-scale machines are typically used to move extremely heavy and/or large loads, and thus typically have extremely large or oversized wheels and/or tires that are typically in the six to twelve foot diameter range. Such large-scale machines are disclosed in, for example, U.S. Pat. Nos. 3,197,229; 3,280,931; 3,645,406; 4,003,447; 4,599,030; 5,165,838; 5,618,151 and 6,328,123 and published U.S. patent application Ser. No. 2002/0175009.

Because the wheels for such large-scale machines are so large, it is possible to place electromotive, hydraulic, pneumatic or other large-scale drive mechanisms directly within the hub of such wheels. Typically, at least some, if not all, of the wheels of such large-scale machines will have independent, direct-drive motors. Due to the size of such wheels, such motors may incorporate any necessary reduction gearing in the assembly provided within the hub of the wheels. Typically, such large-scale self-propelled wheels provided only limited steering ranges, although some of the more complicated designs, such as that shown in the '030 patent, will allow for 360° rotation of the wheels.

However, due to the complicated nature of such drive systems, it is effectively impossible to scale such drive systems down for use with small-scale self-propelled wheels. Additionally, because the power/weight ratios of such large-scale drive systems do not adequately scale down, even if it were possible to provide a scaled-down version of the drive system, the amount of power that could be obtained from such scaled-down large-scale drive systems would be inadequate for small-scale wheels.

At the other end of the size spectrum lie small-scale devices or machines having self-propelled wheels, such as wheelchairs, self-propelled material pallets and platforms, mobile robots, robotic carts and the like. Such small-scale devices are disclosed, for example, in U.S. Pat Nos. 4,573,548; 4,657,104; 5,609,216 and U.S. Pat. No. 6,853,877 and in "Development of a holonomic mobile robot for mobile manipulation tasks", by R. Holmberg et al., FSR'99 International Conference on Field and Service Robots, Pittsburgh, Pa., August 1999, pp 1-6. Each of the '877 patent and Holmberg is incorporated herein by reference in its entirety.

Such small-scale machines typically use a simple two-wheel drive system, where each wheel has its own motor and the machine is balanced on one or more caster wheels in addition to the two driven wheels. This simple design has significant limitations, such as poor or imprecise position, velocity and/or acceleration control, and the inability to move freely in any direction. For example, typical wheelchairs cannot move sideways. Such small-scale machines are also subject to rocking about the caster wheels, which typically results in loss of traction and vehicle sway. Additionally, the pivot point of the driven wheel on the supporting surface is often collinear with the steering axis and the pivot or contact point of the wheel is often quite small. Because such small-scale self-propelled machines typically support significant loads relative to the size of the contact area, rotating the wheels about the steering axis/pivot point typically causes the wheels to slide, rather than roll on the support surface, such as a floor, thus scuffing the support surface. Scuffing not only can leave marks or other discolorations on the support surface, but can actively damage the support surface if the sliding friction of the wheel is sufficiently high.

Some small-scale self-propelled machines use a synchronous drive train, which is also know in this art as a "synchro-drive". Small-scale self-propelled machines that use a synchro-drive system typically have a minimum of three driven wheel assemblies and all of the wheel assemblies are steered and driven in unison, i.e., synchronously. That is, each of the driven wheel assemblies receive the same drive signal indicating forward or backward motion and speed and the same steering signal which indicates direction relative to a reference point on the small-scale self-propelled machine. These signals can be either electronically or mechanically transmitted to the wheel assemblies. It should be appreciated that at least three wheels or wheel assemblies are used because three points are necessary to define a plane and thus the minimum number of wheels to define a meta-stable small-scale machine.

When such machine or devices that incorporate synchro-drive systems operate, the machine or device does not rotate as the wheels pivot for steering. Accordingly, such synchro-drive machines remain in the same orientation regardless of their direction of movement. Straight-line motion is improved, because steering drift is minimized by the locked geometry of the gearing. However, locked gearing also prevents many precision movements. Since the wheels cannot move independently, such synchro-drive machines cannot pivot, spin on their axis, or perform a simulated skid as a maneuver. Additionally, large volumes of space are taken up by the centralized motors, gears, belts, chains, shafts and other mechanical devices used to transmit power from the central motors synchronously to the driven wheel assemblies.

In contrast to synchro-drive machines, small-scale self-propelled holonomic machines use two or more self-propelled wheel assemblies, where the overall holonomic drive system has at least one motor for each degree of freedom. Typically, such holonomic systems use independent steering and drive motors for each wheel assembly. The drive assemblies for such holonomic systems typically have three degrees of freedom for motion within a plane. As discussed in the incorporated '877 patent and Holmberg, on very small machines, small, caster-type wheels are often used, while more standard or traditional sized holonomic machines use standard round wheels. In either case, the weight distribution of the supported load on each wheel assembly is an issue, as all the weight for each wheel is concentrated onto the small surface area contact patch of the wheel. Again, rotation around the steering axis, whether in synchro-drive machines or holonomic machines, typically causes scuffing and floor damage.

It should also be appreciated that such small-scale self-propelled machines, whether synchro-drive machines or holonomic machines, typically omit any suspension elements and are unable to adjust the height of the support platform relative to the wheel assembly.

SUMMARY OF THE DISCLOSED EMBODIMENTS

Typical large-scale self-propelled vehicles provide at least one drive motor for each wheel assembly. However, due to the size of the wheel assemblies, the types of drive motors used with such large-scale machines are inappropriate for use with small-scale machines. The drive systems conventionally used with small-scale self-propelled machines do not provide sufficient mobility or maneuverability for the small-scale self-propelled machines, do not provide sufficient degrees of freedom and/or are unable to avoid scuffing and/or otherwise avoiding damage to the surface on which the small-scale self-propelled machine moves.

This invention provides a dual-wheel self-propelled wheel assembly.

This invention further provides dual-wheel self-propelled wheel assemblies for self-propelled machines.

This invention separately provides a self-propelled wheel assembly for a self-propelled machine having improved load weight distribution, This invention separately provides a self-propelled wheel assembly that is capable of rollingly pivoting about an axis point.

This invention further provides a dual-wheel self-propelled wheel assembly that is able to rollingly pivot about an axis point.

This invention additionally provides a dual-wheel self-propelled wheel assembly having two drive motors that allow the drive assembly to rollingly pivot about an axis point.

This invention additionally provides a dual-wheel self-propelled wheel assembly having an orientation motor and two drive motors that allows the two wheels of the wheel assembly to be individually driven as dual-wheel self-propelled wheel assembly is rollingly pivoted about an axis point by the orientation motor.

This invention separately provides a self-propelled wheel assembly for a small-scale self-propelled machine having a suspension system.

This invention separately provides a self-propelled wheel assembly for a small-scale self-propelled machine having a suspension system having a compliant load sensorer.

This invention separately provides a self-propelled wheel assembly for a small-scale self-propelled machine having a height adjusting motor that adjust a distance between a reference point on the machine and the bottom surface of the wheel of the drive assembly.

This invention separately provides a small-scale self-propelled machine having a plurality of self-propelled wheel assemblies, where at least one of the self-propelled wheel assemblies can adjust a height of a reference surface of the machine relative to the ground that supports at least that drive assembly, to allow the small-scale self-propelled machine to lean or tip.

In various exemplary embodiments of devices and methods according to this invention, a wheel assembly for a small-scale machine, device or load includes a pair of opposing, individually-driven wheels, associated motors and associated gear assemblies. The motors receive separate drive signals from a control electronics subsystem of the wheel assembly. The motors are connected to the wheels via the gear assemblies. Because the wheels are separately driven, the wheel assembly can be driven over a curved path by driving the two wheel assemblies at different speeds or rates.

In various exemplary embodiments of devices and methods according to this invention, the wheel assembly includes some or all of an orientation drive motor, an orientation gear, an orientation drive assembly and an orientation gear assembly. The drive assembly includes a gear that is meshingly engaged with the orientation gear. When the orientation motor drives the drive assembly gear, such as through the gear assembly, the drive assembly gear walks around the circumference of the orientation gear. In various exemplary embodiments, the orientation gear is maintained at a fixed position relative to the machine, device or load supported by the wheel assembly. Accordingly, as the drive assembly gear walks around the circumference of the orientation gear, the orientation of the pair of opposing, individually-driven wheels relative to the machine, device or load supported by the wheel assembly changes.

In various exemplary embodiments, the rotational axis that the wheel assembly rotates about when the drive assembly gear walks around the circumference of the orientation gear does not pass through either of the wheels of the pair of opposing, individually-driven wheels. Thus, when the wheel assembly is re-oriented by driving the drive assembly gear, the wheels can be allowed to rotate freely, or can be controllably rotated at the appropriate rate, so the wheels rotate and move along a curved path that is centered on the rotational axis that the wheel assembly. In various other exemplary embodiments, the wheel assembly can be re-oriented by driving the drive assembly gear at the same time that the opposing, individually-driven wheels are driven to move the machine, device or load supported by the wheel assembly relative to the surface they are resting on. In this situation, the machine, device or load moves along a complicated curved path resulting from the simultaneous lateral movement provided by the opposing, individually-driven wheels and the change in orientation of those wheels provided by the orientation drive motor.

In various exemplary embodiments of devices and methods according to this invention, the wheel assembly includes a height adjusting motor, an associated gear, a vertical lift screw and associated vertical lift nut, a guide shaft, a thrust bearing and a bearing housing containing a centering bearing and a load bearing that are all positioned around the guide shaft, and a mounting plate that is attached to the bearing housing. The guide shaft is connected to a frame that carries the pair of opposing, individually-driven wheels, the associated motors and the associated gear assemblies, and the orientation drive motor, the orientation gear, the orientation drive assembly and the orientation gear assembly. The load of the machine, device or load that is supported by the wheel assembly is transferred from the mounting plate through the load bearings and the compliant load sensorber to the vertical lift nut, then to side plates of the frame, and then to the wheels.

The centering bearing and the load bearing contained within the bearing housing allow the mounting plate to rotate relative to the guide shaft. In various exemplary embodiments, the orientation gear is at least indirectly attached to the mounting plate. In this situation, when the orientation motor drives the orientation drive gear to walk around the circumference of the orientation gear, the guide shaft and the rest of the elements attached to the frame rotate relative to the mounting plate via the load and centering bearings.

In various exemplary embodiments, the relative position between the mounting plate and the frame can be adjusted by appropriately energizing the height adjusting motor. Depending on the direction the height adjusting motor is driven, the vertical lift screw is rotated relative to the vertical lift nut to move the frame closer to or farther away from the mounting plate. Because the mounting plate is attached to the machine, device or load that is supported by the wheel assembly, and the wheels on the support surface support the frame, this alters the distance between the machine, device or load and the wheels. If this distance is reduced, and the machine, device or load that is otherwise fully supported, such as by the other wheel assemblies, this will cause the wheels to be lifted from the support surface Otherwise, this will cause the machine, device or load that is supported by the wheel assembly to dip or tilt toward the support surface. If this distance is increased, and the machine, device or load is supported by this wheel assembly, the machine, device or load will be lifted or tilted away from the support surface. Otherwise, the wheels will be lowered toward the support surface.

Depending on the direction(s) the two wheels are driven at, and the individual rotational rate(s)s the two wheels are driven at, the pair of opposing, individually-driven wheels can move along a straight or curved path in either forward or backward directions, and/or can rotate about a rotational axis. The location of the rotational axis can be positioned at any point between the two wheels or at any point lying along a line that is parallel to the rotational axes of the wheels. When the wheels are driven in opposite directions, the rotational axis will lie between the wheels. The position of the rotational axis will depend on the relative rotational rates of the two wheels. If the two rotational rates are equal, the rotational axis will lie at the midpoint between the two wheels. If one wheel rotates more slowly that the other wheel, the rotational axis will lie closer to that slower-rotating wheel. When the wheels are driven in the same direction, the wheel assembly will move in a straight line when the rotational rates are equal. If one wheel rotates more slowly that the other wheel, the rotational axis will lie on that side of the wheel assembly. The distance from the wheel assembly to the rotational axis will depend on the relative rotational rates and the distance between the two wheels.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following FIGS., wherein.

DETAILED DESCRIPTION OF EXEMPLARY EMBODIMENTS

Figure 1:
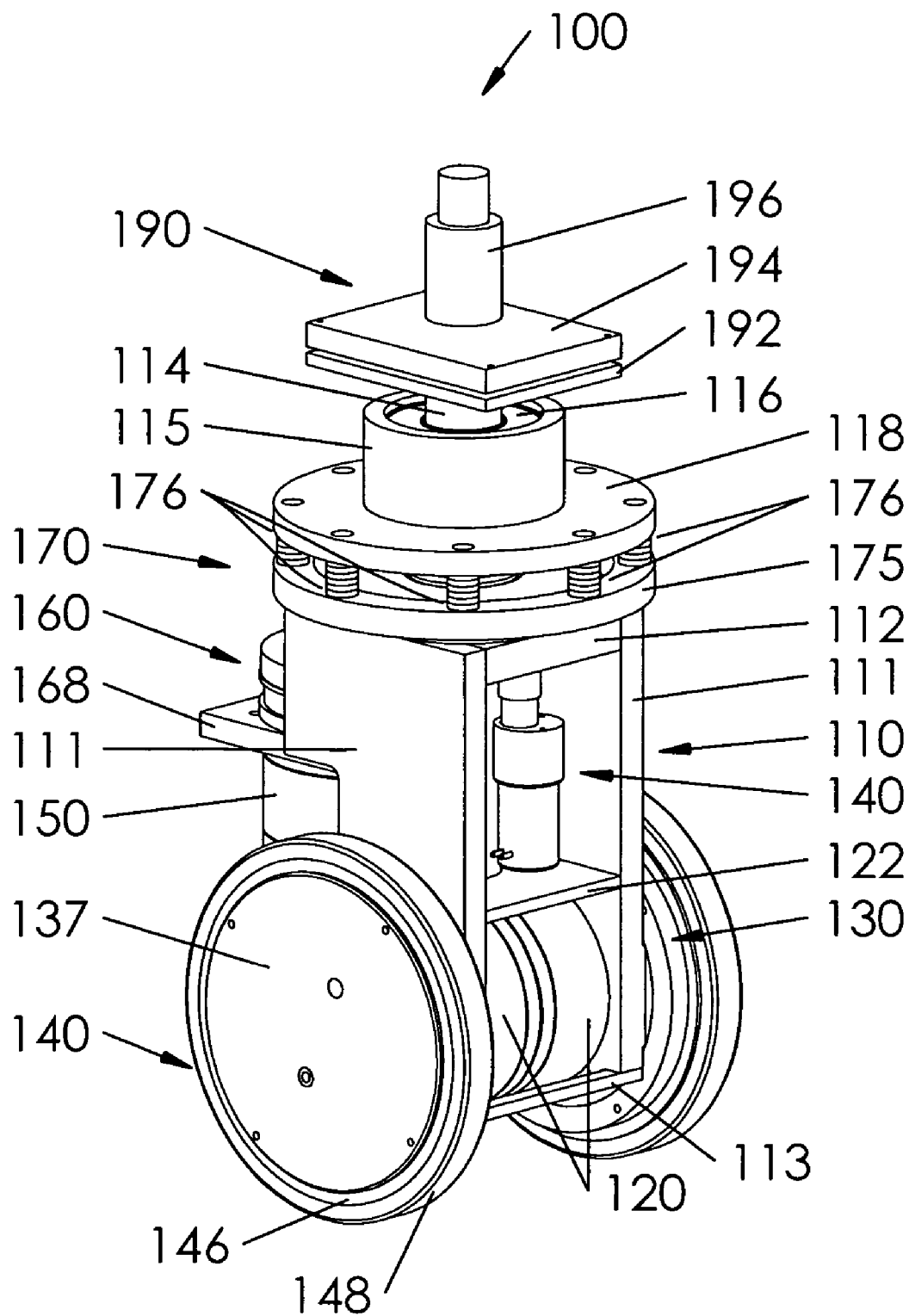
FIG. 1 is a perspective view of one exemplary embodiment of a dual-wheel self-propelled wheel assembly according to this invention.

As outlined above, current technologies for self-propelled wheel assemblies are either designed for very large scale industrial uses that are inappropriate for small scale uses or, if appropriate for small scale uses, have serious drawbacks. That is, current small scale self-propelled wheel assemblies for indoor mobile robots, wheelchairs, pallet jacks, platforms and the like are either insufficiently maneuverable, are too large and/or are powered inappropriately. The following discussion is directed to one exemplary embodiment of a wheel assembly useable with such indoor mobile and/or autonomous robots, robotic carts, wheelchairs, pallet jacks, robotic platforms or pallets and the like. This exemplary wheel assembly has been designed in view of a number of design considerations. It should be appreciated that other exemplary embodiments according to this invention may differ from the exemplary embodiment described herein, based at least in part on which of the following design considerations any such other exemplary embodiment has been designed in view of.

In particular, the design considerations considered when developing the disclosed exemplary embodiment include that the wheel assembly be self contained, that the wheel assembly be easily removable from the larger overall assembly as a unit, that the wheel assembly can be quickly electrically and/or mechanically disconnected from the overall assembly as a unit, that the wheel assembly have a significant weight-bearing capability and specifically have, in various exemplary embodiments, a weight bearing capability of at least around 1000 pounds, that the wheel assembly have a continuous orientation rotation that is not limited, that the wheel assembly have a height adjustment feature, and/or that the wheel assembly meet certain speed and/or acceleration specifications. Because various exemplary embodiments of the wheel assembly according to this invention are intended for at least indoor use, and tethering the wheel assembly, and thus the device to which it is mounted, to an electrical outlet is generally undesirable, battery power is desirable.

Various exemplary embodiments of devices that incorporate three or more wheel assemblies according to this invention, when operating under heavy load conditions, could consume on average up to about 5000 watts when driving the wheels, which, in household power terms, it is approximately 6.7 horsepower. Additionally, maximizing battery volume with a low center of gravity to avoid tipping over the overall device is also desirable.

Because various exemplary embodiments are intended for indoor use, the overall size of the device to which the wheel assemblies are attached must be able to fit through doorways and be maneuverable within, and otherwise appropriate for, such indoor spaces. For example, soft surfaces like vinyl or linoleum require, for the wheel assembly to be surface-friendly, that the wheel assembly apply a low force per square inch to such floor surfaces. Because indoor use is desirable, and the width of doorways and other interior spaces is limited, limiting the width of the wheel assemblies is also desirable.

FIGS. 1-4 show a side perspective view, and front, rear and side plan views, respectively, of one exemplary embodiment of a dual-wheel self-propelled wheel assembly 100 according to this invention. As shown in FIGS. 1-4, the dual-wheel self-propelled wheel assembly 100 includes a support structure 110 that supports the various motors or actuators, such as motors 120 and 150, various gear assemblies, such as gear assemblies 130 and 160, and an orientation drive/steering assembly 170, a height adjusting assembly 180 and various electrical connections and electronics 190. As shown in FIGS. 1-4, the support structure 110 includes a pair of nominally vertically-oriented side plates 111, a pair of nominally horizontally-oriented base plates 112 that extend between the side plates 111 and one or more struts 113 that also extend between the side plates 111. The support structure 110 also includes a central hollow guide shaft 114, a bearing housing 115, a centering bearing 116 and a load bearing 117, which can be better seen in see FIG. 9, positioned between the guide shaft 114 and the bearing housing 115, and a mounting plate 118. The mounting plate 118 is useable to mount or otherwise connect or attach the dual-wheel self-propelled wheel assembly 100 to an appropriate device, such as a robotic pallet and/or cart that is to be self-propelled, a wheelchair, a pallet jack, a robotics platform, robotic cart or other mobile platform or the like.

As shown in FIGS. 1-4, the dual-wheeled self-propelled wheel assembly 100 includes a pair of wheel motors 120 that are mounted to and extend through the side plates 111. Each wheel motor 120 is drivingly connected through the wheel gear assembly 130 to a wheel 140. Similarly, the orientation motor 150 is mounted via an orientation drive mount 168 of the orientation drive gear assembly 160 to the side plates 111. The orientation motor 150 extends through the orientation drive mount 168 and is operationally connected to the orientation drive/steering assembly 170 via the orientation drive gear assembly 160. The orientation motor 150 rotates the dual-wheeled self-propelled wheel assembly 100 about a vertical axis. In particular, this vertical axis is the axis of the guide shaft 114.

As also shown in FIGS. 1-4, the height adjusting assembly 180 is mounted to the lower base plate 112 of the dual-wheeled self-propelled wheel assembly 100. The height adjusting assembly 180 extends through the upper base plate 112 and supports the orientation drive/steering assembly 170. As discussed in greater detail below, operating the height adjusting assembly 180 allows the relative positioning between a vertical lift nut 185 and a vertical lift screw 184 to be altered or adjusted. This alters the overall distance between the mounting plate 118 and the surface on which the dual-wheeled self-propelled wheel assembly 100 rests. By adjusting the vertical lift screw 184 and thus the height of the dual-wheel self-propelled wheel assembly 100, the dual-wheel self-propelled wheel assembly 100 can cause the robotic cart to which it is mounted to lean, to lift its wheels and the like.

As shown in FIGS. 1-4, the orientation drive/steering assembly 170 includes a stationary steering gear 175 that is attached via a plurality of spacers 176 to the mounting plate 118. It should be appreciated that the stationary steering gear 175 includes a plurality of gear teeth along its inner surface and interacts with a drive gear of the orientation drive gear assembly 170 which is driven by the orientation motor 150, to cause the dual-wheeled self-propelled wheel assembly 100 to rotate clockwise or counterclockwise about the axis of the guide shaft 114 when the orientation motor 150 is activated. It should be appreciated that, due to the dual wheels 140, the axis of rotation does not pass through the points of contact of the wheels 140 on the support surface.

As shown in FIGS. 1-4, each of the wheels 140 includes, in part, a tire 148 that is mounted on a rim 146. A gear hubcap 137 is associated with each wheel 140. The gear hubcap 137 of a corresponding wheel gear assembly 130 transmits drive torque to the corresponding wheel 140, as well as covers and protects that wheel gear assembly 130 from contamination and the like.

Finally, as shown in FIGS. 1-4, a plurality of control electronics 194 are mounted on an electronics platform 192. Control commands, data, signals and electrical power are provided to the control electronics 194, as well as the wheel motors 120, the orientation motor 150, and an actuator of the height adjusting assembly 180 via rotational signal power coupler 196 from a remotely located controller or control device (not shown) and/or from another one of the wheel assemblies 100. The control electronics 194 also outputs various control command and data signals back to the remotely located controller or control device, and/or to another one of the wheel assemblies 100. It should be appreciated that the rotational signal power coupler 196 is typically implemented using slip rings, rotary electrical connectors or the like.

Figure 2:
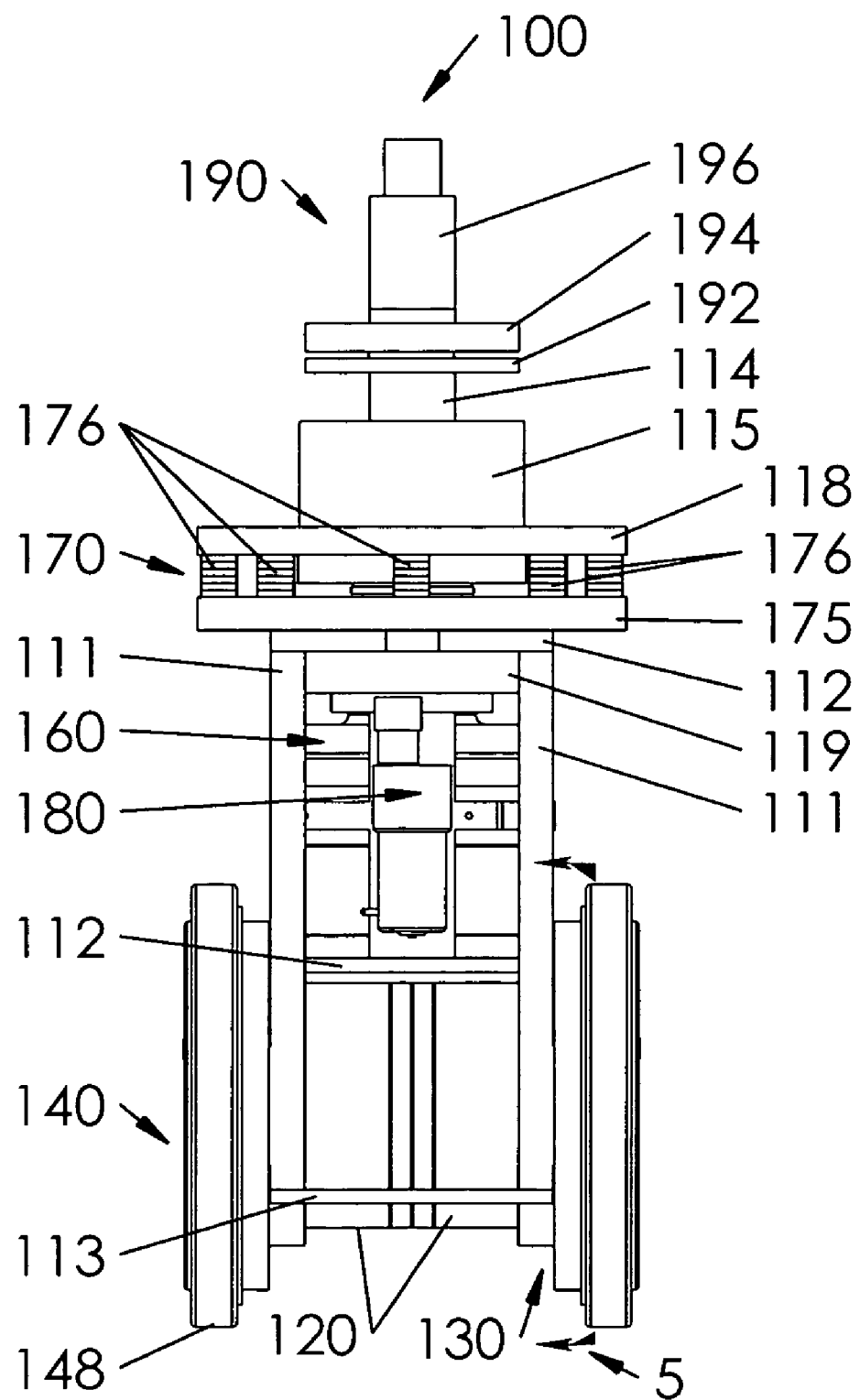
FIG. 2 is a front plan view of the dual-wheel self-propelled wheel assembly shown in FIG. 1.
Figure 3:
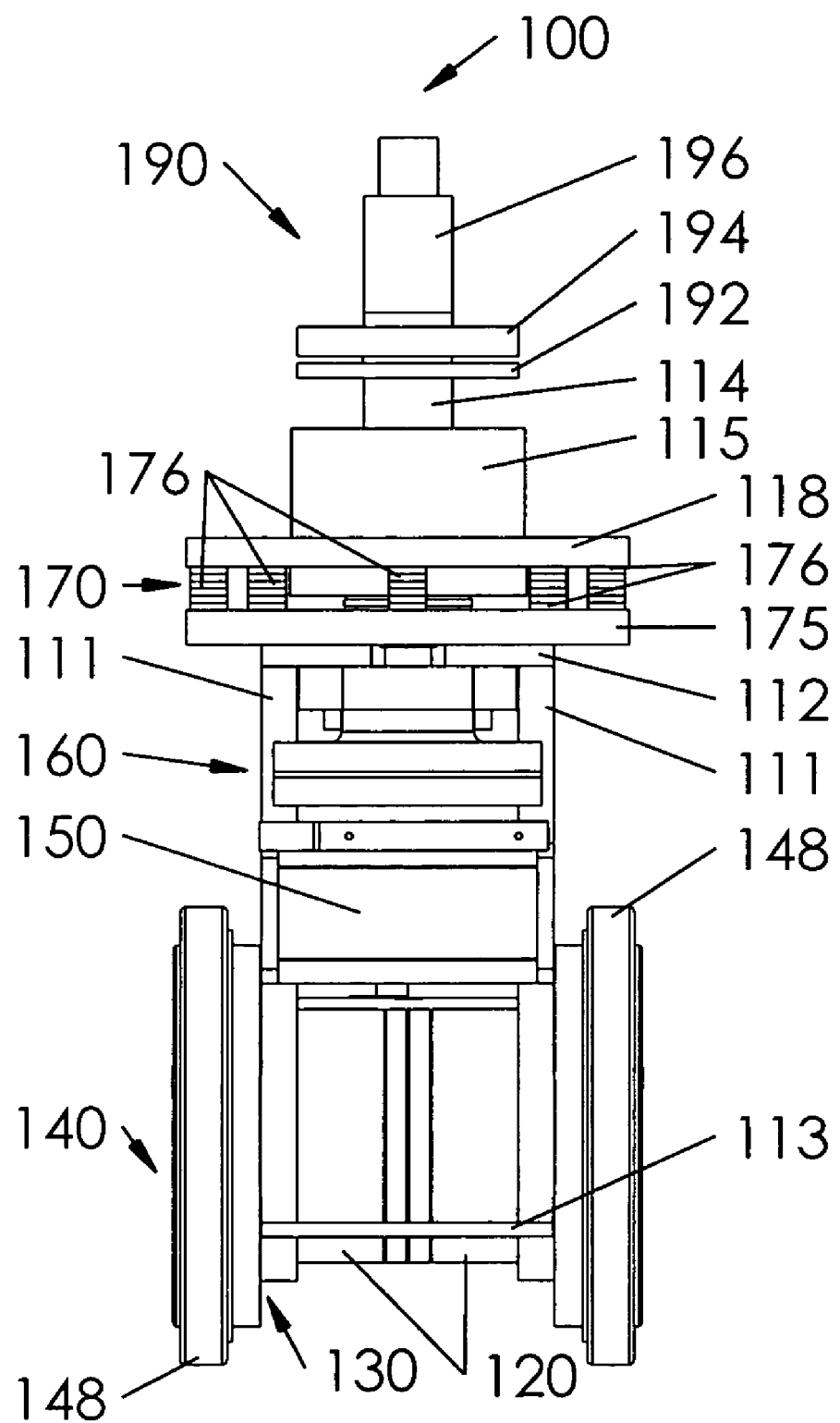
FIG. 3 is a rear view of the dual-wheel self-propelled wheel assembly shown in FIG. 1.
Figure 5:
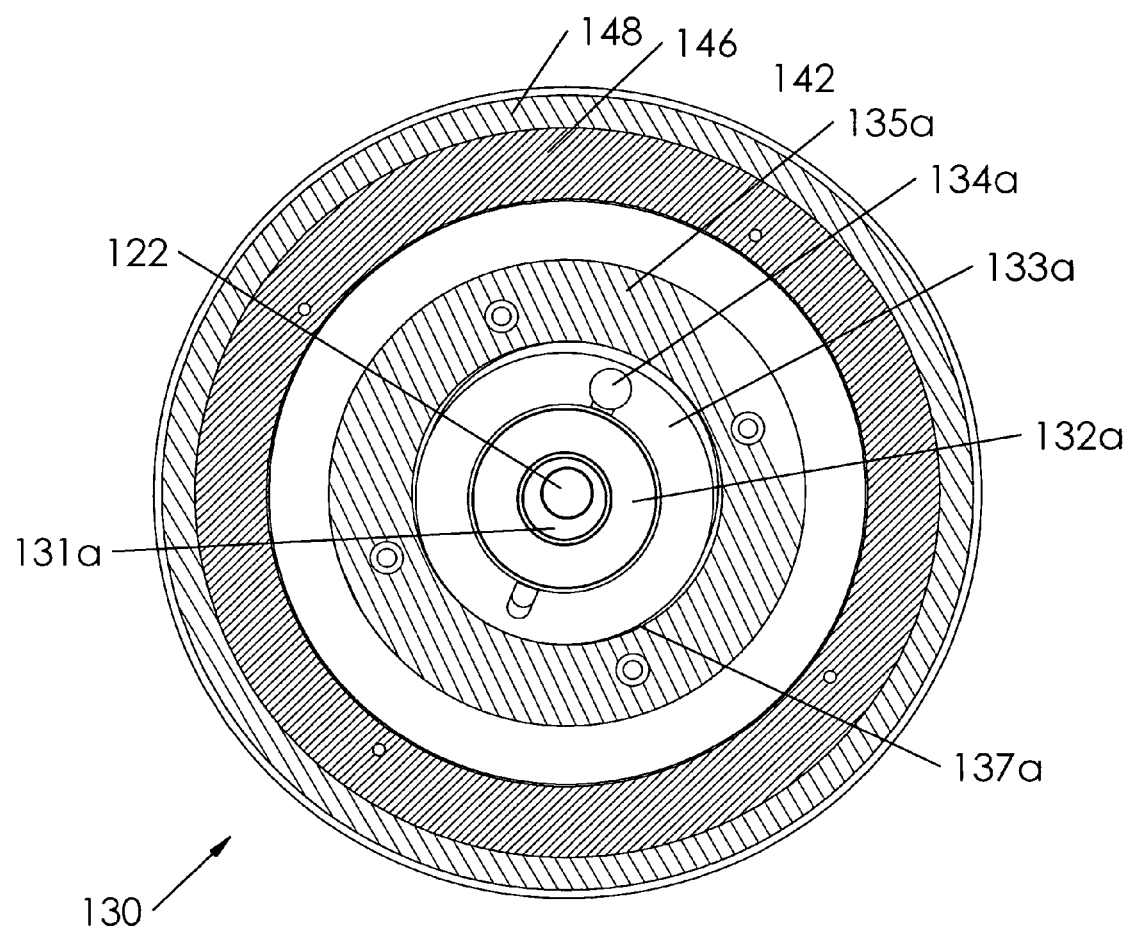
FIG. 5 is a cross sectional view of one wheel gear assembly taken along the line of 5 shown in FIG. 2.
Figure 6:
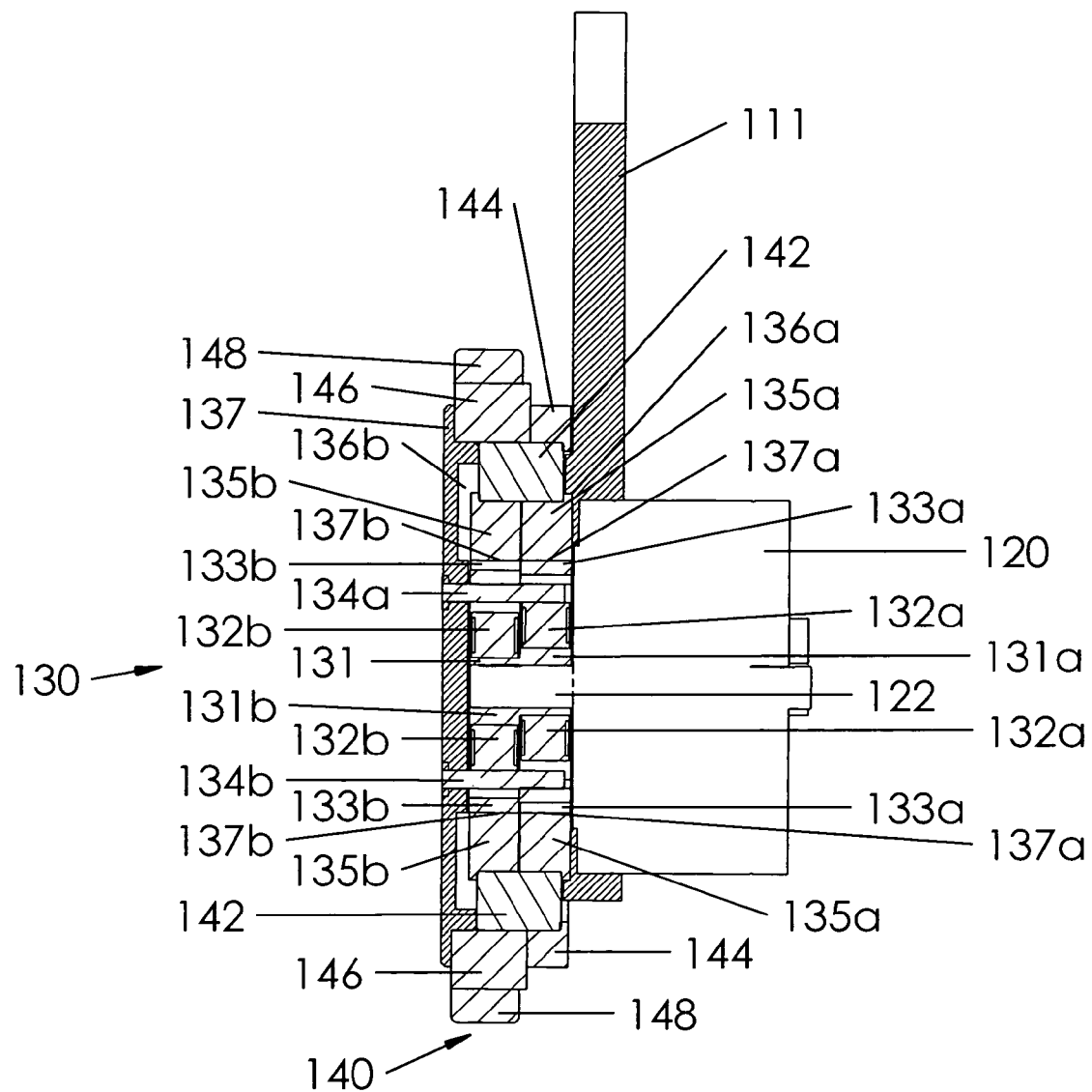
FIG. 6 is a cross sectional view of the wheel motor, wheel gear assembly and wheel taken along the line 6 shown in FIG. 4.

FIG. 5 is a cross sectional view of the wheel gear assembly 130 and the wheel 140, taken along the line 5-5 shown in FIG. 2. As shown in FIGS. 5 and 6, the wheel gear assembly 130 includes a hypocyclic cam 131 that is mounted around an output shaft 122 of the wheel motor 120. The hypocyclic cam 131 has two lobes 131a and 131b. Each cam lobe 131a and 131b is circular and is associated with a different one of two sets 136a and 136b of gear elements of the wheel gear assembly 130. As shown in FIGS. 5 and 6, the first lobe 131a and the second lobe 131b of the cam 131 are each generally circular. However, the cam 131 is mounted to the output shaft 122 of the motor 120 such that the geometric centers of the first and second lobes 131a and 131b of the hypocyclic cam 131 are not aligned with the rotational axis of the output shaft 122.

That is, as shown in FIGS. 5 and 6, the center of the first lobe 131a of the hypocyclic cam 131 is offset from the center of the output shaft 122 of the wheel motor 120. The second lobe 131b is likewise offset from the center of the output shaft 122 of the wheel motor 120. That is, lobes 131a and 131b of the hypocyclic cam 131 are eccentrically mounted to the output shaft 122. In various exemplary embodiments, the first and second lobes 131a and 131b are offset from the rotational axis of the output shafts along directions that are 180° apart. That is, the first and second lobes 131a and 131b are 180° apart.

A hypocyclic cam bearing 132a is mounted around the hypocyclic cam 131, and a hypocyclic inner gear 133a is mounted around the hypocyclic cam bearing 132a. A pair of drive torque pins 134a and 134b extend through the hypocyclic inner gears 133a and 133b. Each drive torque pin 134a and 134b is attached at one end to the gear hubcap 137.

As shown in FIG. 5, the hypocyclic inner gear 133a rotates within an outer hypocyclic gear 135a in a hypocyclic or epicyclic manner. The hypocyclic inner gear 133a has a plurality of gear teeth on its outer surface, while the hypocyclic outer gear 135a has a larger number of gear teeth on its inner edge facing the gear teeth of the hypocyclic inner gear 133a. It should be appreciated that the axis of rotation of the hypocyclic outer gear 135a is collinear with, or aligned with, the rotational axis of the output shaft 122 of the wheel motor 120. A load bearing 142 of the wheel 140 is mounted around the outside of the hypocyclic outer gear 135a, while the rim 146 is mounted on the outside of the wheel load bearing 142.

Figure 4:
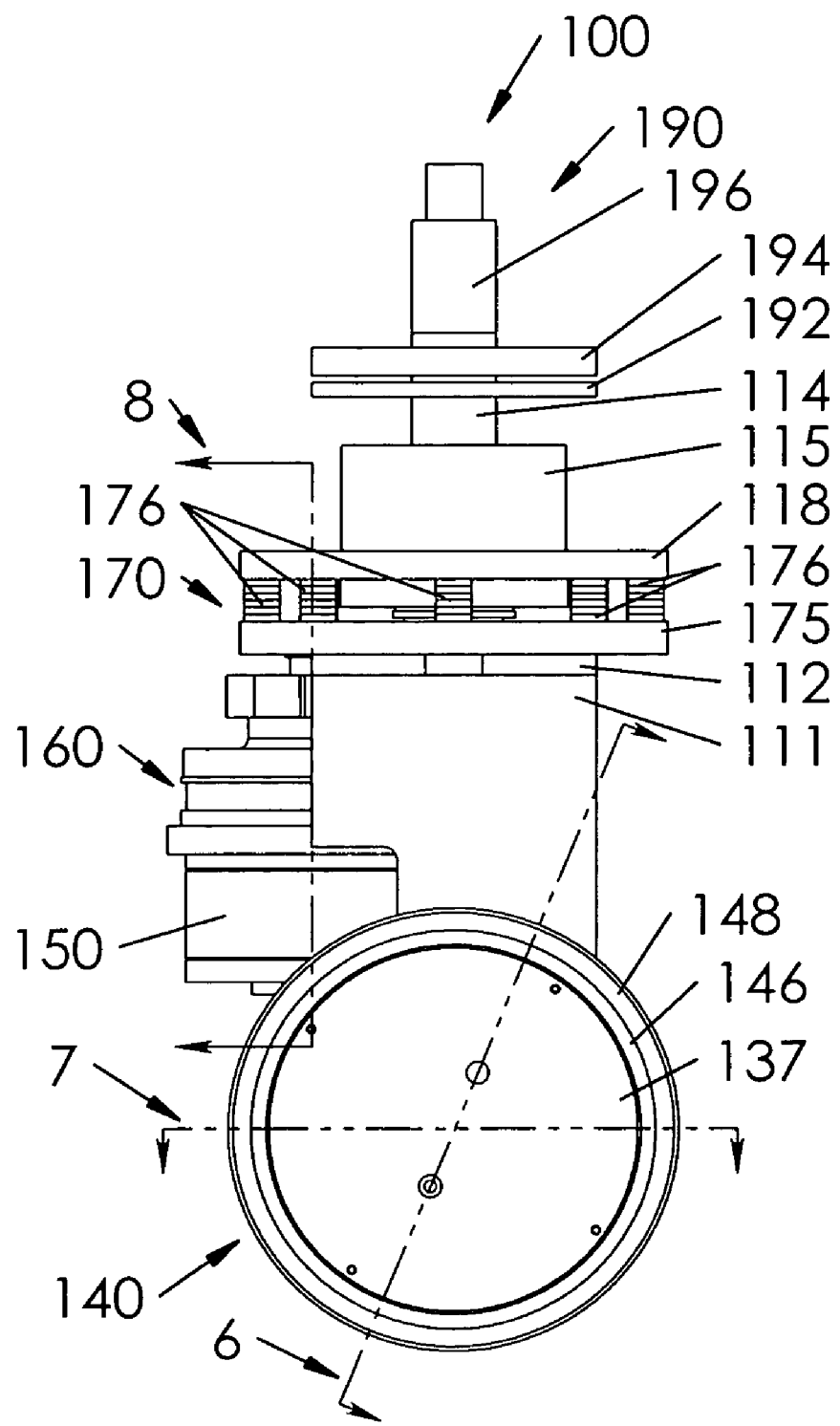
FIG. 4 is a side plan view of the dual-wheel self-propelled wheel assembly shown in FIG. 1.
Figure 7:
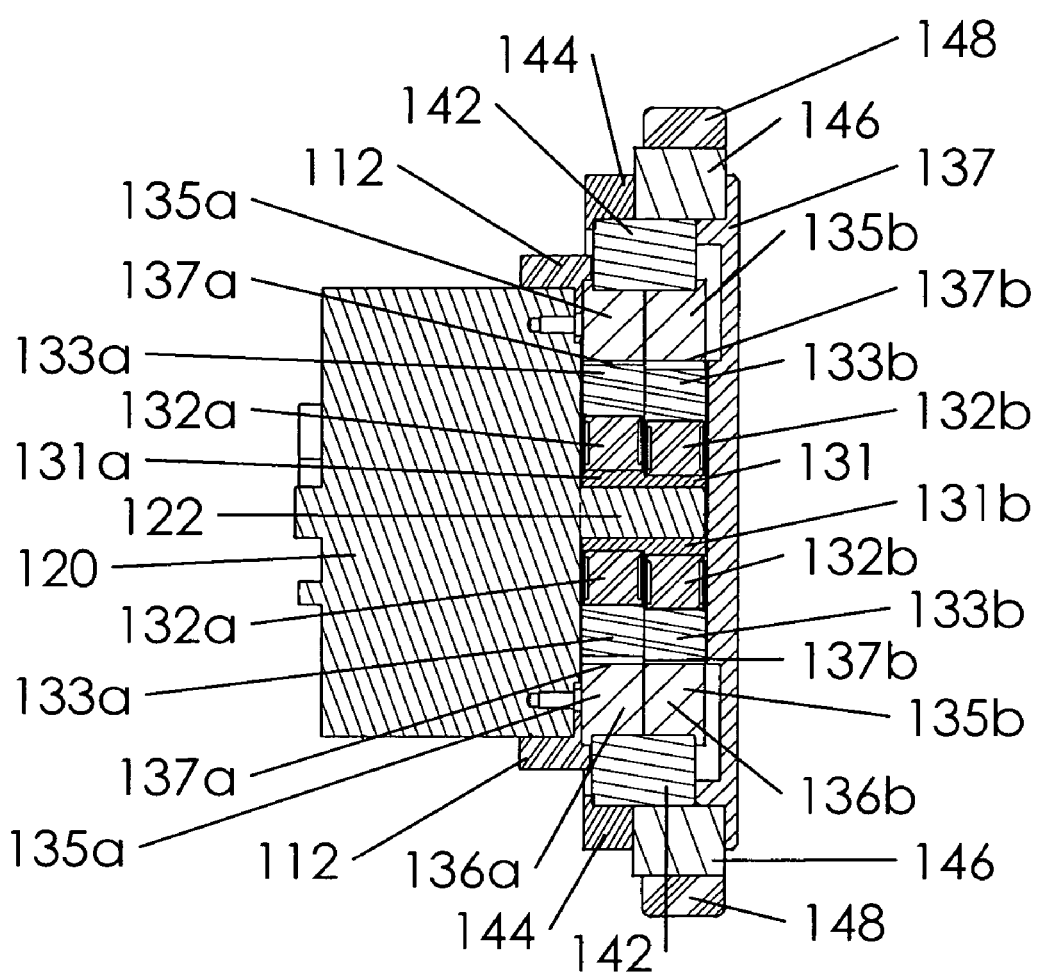
FIG. 7 is a cross sectional view of the wheel motor, wheel gear assembly and wheel taken along the line 7 shown in FIG. 4.

FIGS. 6 and 7 show two different side cross sectional views through the side plate 111, the wheel motor 120, the wheel gear assembly 130 and the wheel 140 along the lines 6-6 and 7-7 shown in FIG. 4. As shown in FIGS. 6 and 7, the motor 120, which is not shown in cross section, is mounted on the side plate 111. In particular, the output shaft 122 of the wheel motor 120 extends through the side plate 111 and into the wheel gear assembly 130. As shown in FIGS. 6 and 7, the wheel gear assembly includes the hypocyclic cam 131 and the gear hub cap 137 and inboard and outboard sets 136a and 136b respectively of the hypocyclic cam bearings 132a and 132b, the hypocyclic inner gears 133a and 133b, and the hypocyclic outer gears 135a and 135b, as well as the plurality of drive torque pins 134a and 134b.

As shown in FIGS. 6 and 7, the hypocyclic cam 131 has an inboard portion corresponding to the inner set 136a of the hypocyclic cam bearing 132a, the hypocyclic inner gear 133a and the hypocyclic outer gear 135a that is eccentrically offset from the output shaft 122 differently than is an outboard portion of the hypocyclic cam 131 and the outer set 136b of the hypocyclic cam bearing 132b, the hypocyclic inner gear 133b and the hypocyclic outer gear 135b. It should be appreciated that, in various exemplary embodiments, the inboard and outboard portions of the hypocyclic cam 131 are arranged such that the maximum deviation of those portions from the axis of rotation of the output shaft 122 are spaced from each other circumferentially by 180°. should also be appreciated that no offset between the inner and outer portions could be used, although this tends to reduce the usefulness of having the inner and outer sets 136a and 136b.

As shown in FIGS. 6 and 7, the load bearing 142 of the wheel 140 extends over both of the inner and outer hypocyclic outer gears 135a and 135b. A load-bearing retainer 144 connects to the rim 146 and retains the load bearing 142 in the desired position relative to the inner and outer hypocyclic outer gears 135a and 135b. Similarly, the gear hubcap 137 is connected by the drive torque pins 134a and 134b to the inboard and outboard hypocyclic inner gears 133a and 133b. The gear hubcap 137 also contacts the outer edge of the load bearing 142 and the rim 146 to help maintain these elements in position and/or to dirt, dust and other contaminants from entering the wheel gear assembly 130.

It should be appreciated that the wheel gear assembly 130 is, in various exemplary embodiments, implemented using the hypocyclic gears, because the hypocyclic gears take up relatively little space laterally, i.e., along the axis of the output shafts 122 of the wheel motors 120. As outlined above, based on the desired torque and rotational velocity of the wheels 140, in view of the particular size and type of the motor 120, a fairly high gear reduction ratio was required. However, as outlined above, because limiting the lateral width of the wheel assemblies, and thus reducing the minimum width of any device to which the dual-wheeled self-propelled wheel assemblies 100 are attached to, is desirable, many gear systems were inappropriate.

In various exemplary embodiments of the dual-wheeled self-propelled wheel assembly 100, powerful, compact, short and relatively light motors are desirable for at least the wheel motors 120. Typical iron-core armature electrical motors have many problems, including long axial lengths, large radial sizes, poor power to weight ratios and large weights. Accordingly, in various exemplary embodiments of the dual-wheeled self-propelled wheel assembly 100, at least the wheel motors 120 are implemented using a zero-winding copper core motor called the ServoDisc motor, which is available through Kollmorgen Motion Technologies Group of Cormack, N.Y. However, it should be appreciated that the wheel motors 120, and the orientation motor 150 as well, can be implemented using direct drive motors, brushed or brushless DC motors, brushed or brushless AC motors, pneumatic motors, hydraulic motors, or any other known or later developed motor that has appropriate size, power, and/or power to weight ratio values.

This motor is a brushed or brushless dc motor with a linear torque curve. In contrast, most motors have a torque curve where the torque is based on the rotational speed of the motor, where high torque is generated under low speed conditions and low torque is generated under higher speed conditions. In contrast, the torque curve in the ServoDisc motor is a line perpendicular to the torque axis such that the ServoDisc motor outputs the same torque at full speed as it does at just greater than zero rpm. In addition, ServoDisc motors have high power to weight and power to size ratios and have a short axial length. For example, various exemplary embodiments of the ServoDisc motor have axial lengths of three inches or less.

It should be appreciated that, while the above-outlined description of various exemplary embodiments of dual-wheeled self-propelled wheel assemblies according to this invention discussed electric motors in detail, the motors usable with various exemplary embodiments of dual-wheeled self-propelled wheel assemblies according to this invention are not limited to such electric motors. Rather, any appropriate known or later-developed motor, such as, for example, mechanical, electrical, hydraulic and/or pneumatic motor systems can be used with dual-wheeled self-propelled wheel assemblies according to this invention.

However, the gear ratio range defined by using the ServoDisc motor was problematic. In particular, using the ServoDisc motor suggested a fairly high gear reduction, potentially requiring a long gear train requiring significant space. However, as outlined above, it is desirable to minimize the lateral space of the dual-wheeled self-propelled wheel assembly 100. In particular, while various pinion-based gear combinations, various compound gear combinations and various planetary gear combinations can be used, all these gear systems require significant space between the wheel motor 120 and the wheel 140. While, when space constraints are not a consideration, such gear systems are perfectly acceptable, when trying to limit the width of the dual-wheeled self-propelled wheel assembly to improve its usability in interior spaces, such gear systems could be problematic. Likewise, harmonic drive gear systems could be used. However, in addition to causing wider wheel spacing, as in the other gear systems mentioned above, harmonic gears are relatively quite expensive and generally require using low profile, large-diameter bearings.

Hypocyclic gearings operate similarly to harmonic drive gears but at a fraction of the cost. Hypocyclic gears operate under a spyrographic effect by having an inner gear having an axis of rotation that is offset from the axis of rotation of a drive element for that internal gear. The hypocyclic inner gear has gear teeth on its exterior surface, while the hypocyclic outer gear has gear teeth on its inner surface. The hypocyclic outer gear also has its axis of rotation collinear with the axis of rotation of the drive element.

In the exemplary embodiment shown in FIGS. 5 and 6, the hypocyclic cam 131 has two lobes 131a and 131b, such that the inside hypocyclic cam bearings 132a and 132b and the hypocyclic inner gears 133a and 133b use cam offsets that are spaced 180° apart around the circumference of the hypocyclic cam 131 i.e., are 180° out of phase. This tends to balance the forces applied to the hypocyclic cam 131 and the output shaft 122. In the exemplary embodiment shown in FIG. 5, each lobe 131a and 131b of the hypocyclic cam 131 has an axis of rotation that is collinear with the axis of rotation of the corresponding hypocyclic inner gear 132a and 132b, respectively, but which, like the hypocyclic inner gears 132a and 132b, is offset from the axis of rotation of the output shaft 122 and the hypocyclic outer gears 135a and 135b.

An analysis of the gear teeth loading on a single one of the hypocyclic gear sets 136a and 136b of the exemplary embodiment shown in FIGS. 5-7 indicated that the gear loading was within tolerances, but did not provide a large safety margin. At the same time, to keep the wheel gear assembly 130 and the wheel 140 relatively narrow, the load bearing 142 between the wheel gear assembly 130 and the wheel 140 needed to be almost as large as the rim 146, suggesting the load bearing 142 could be used as part of the rim 146 of the wheel 140. Accordingly, in the exemplary embodiment shown in FIG. 5, the outer hypocyclic ring gears 135a and 135b were modified to allow the large wheel bearing 142 to fit over them, so they act as the hub for the load bearing 142. However, the appropriate commercially available bearing was significantly wider than each of the hypocyclic gear sets 136a or 136b alone. Accordingly, providing two hypocyclic gear sets 136a and 136b in this particular exemplary embodiment does not consume significant additional space, while reducing the gear teeth loading, resulting in a large safety margin and long average life for the gear sets 136a and 136b.

To transfer torque from the hypocyclic inner gears 133a and 133b to the wheel 140, passages are provided in the hypocyclic inner gears 133a and 133b. The drive torque pins 134a and 134b are mounted on the gear hub cap 137 and inserted through the passages in the hypocyclic inner gears 133a and 133b to transfer the drive torque from the hypocyclic inner gears 133a and 133b to the wheel 140. The gear hub cap 137, as outlined above, also encapsulates the hypocyclic gear sets 136a and 136b to protect against oil leakage and to protect against contamination by dirt and other environmental contaminants.

It should be appreciated that, while the above-outlined description of exemplary embodiments of dual-wheeled self-propelled wheel assemblies according to this invention discussed hypocyclic gears in detail, dual-wheeled self-propelled wheel assemblies according to this invention are not limited to using hypocyclic gears. Rather, it should be appreciated that any known or later-developed gear structures that allow any space, weight and/or size constraints to be met can be used in place of the hypocyclic gears described above. For example, so-called "2-stage cycloidal" gears, available from Nabtesco Precision U.S.A., Novi, Mich., could be used in place of the hypocyclic gears described above.

Figure 8:
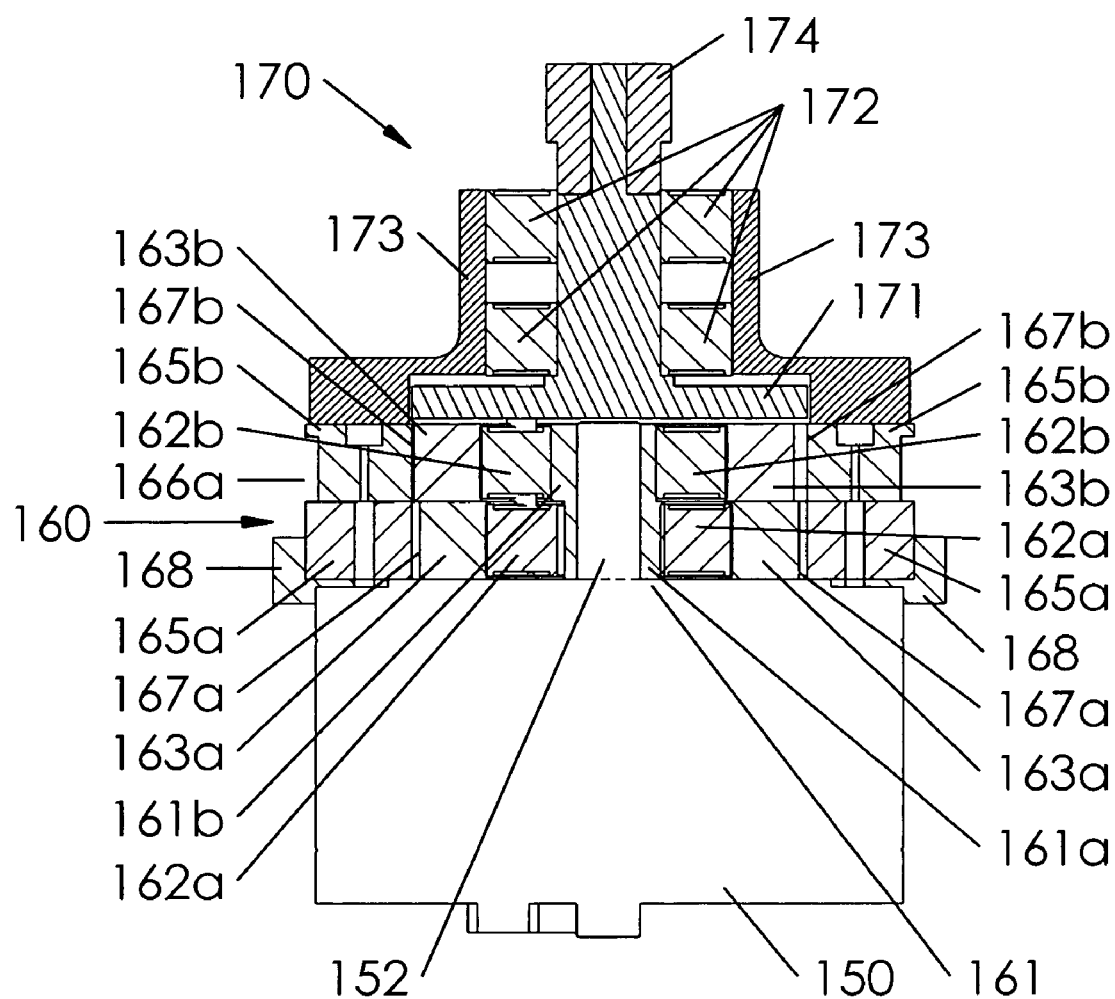
FIG. 8 is a cross sectional view of the orientation wheel motor, orientation drive gear assembly and orientation drive/steering assembly taken along the line 8 shown in FIG. 4.

FIG. 8 is a cross-sectional view, taken along the line 8 in FIG. 4, of one exemplary embodiment of the orientation motor 150 and the orientation drive gear assembly 160. It should be appreciated that the orientation motor 150 is connected via its output shaft 152 to a hypocyclic cam 161 of the orientation drive gear assembly 160. Like the hypocyclic cam 131, the hypocyclic cam 161 has two lobes 161a and 161b that are 180° out of phase. Similarly, like the wheel gear assembly 130, the orientation drive gear assembly 160 has two hypocyclic gear sets 167a and 167b. A pair of hypocyclic cam bearings 162a and 162b are provided between the hypocyclic cam 161 and a pair of hypocyclic inner gears 163a and 163b. A pair of hypocyclic outer gears 165a and 165b are provided around, and mesh with, the hypocyclic inner gears 163a and 163b, respectively. An orientation drive mount 168 is used to connect the orientation drive gear assembly 160 to the support structure 110, as well as to connect the orientation motor 150 to the hypocyclic outer gears 165a and 165b.

It should be appreciated that the orientation drive gear assembly 160 operates essentially identically to the wheel gear assembly 130. In particular, the hypocyclic drive hub 171 is connected via one or more drive torque pins (not shown) to the hypocyclic inner gears 163a and 163b. The hypocyclic drive hub 171 is supported within an orientation bearing retainer 173 by a pair of orientation bearings 172. The orientation bearing retainer 173 is also attached to the hypocyclic outer gears 165a and 165b. An orientation pinion gear 174 is mounted to the outer end of the hypocyclic drive hub 171.

In operation, the orientation pinion gearing 174 meshingly engages with the gear teeth on the inner surface of the stationary steering gear 175. When the orientation motor 150 is energized, rotation of the output shaft 152 causes the hypocyclic inner gears 163a and 163b, and thus hypocyclic drive hub 171, to rotate. Rotation of the hypocyclic drive hub 171 is transferred to the orientation pinion gear 174. The pinion gear 174, when rotating, causes the support structure 110 to rotate about the rotational axis established by the guide shaft 114 as the pinion gear 174 "walks" around the inside of the stationary steering gear 175.

As a result, when the orientation motor 150 is energized, the dual-wheel self-propelled wheel assembly 100 rotates about a rotational axis established by the drive shaft 114 which is spaced away from the contact points of the tires 148 on the support surface on which the dual-wheel self-propelled wheel assembly 100 rests. As a consequence, when the orientation motor 150, along with the two wheel motors 120, is actuated, the two wheels 140 of the dual-wheel self-propelled wheel assembly 100 rollingly rotate in opposite directions about the axis of the guide shaft 114. Conventional wheel assemblies have their rotational axes passing through the contact points on the support surface, and thus scuff, mar, or otherwise damage the support surface due to the sliding movement of their tires on the support surface when they are re-oriented. In contrast, re-orienting the dual-wheel self-propelled wheel assembly 100 according to this invention does not mar, scuff or otherwise damage the surface on which it is resting, as the tires 148 roll as the dual-wheel, self-propelled wheel assembly 100 is re-oriented.

It should also be appreciated that the orientation motor 150 can be operated in either direction and can be operated indefinitely. That is, the orientation pinion gear 174 can complete multiple circles around the interior circumference of the stationary searing gear 175 without running into any limits, stops or the like which limit the overall rotational freedom of the support structure 100 to rotate about the axis of the guide shaft 114.

Figure 9:
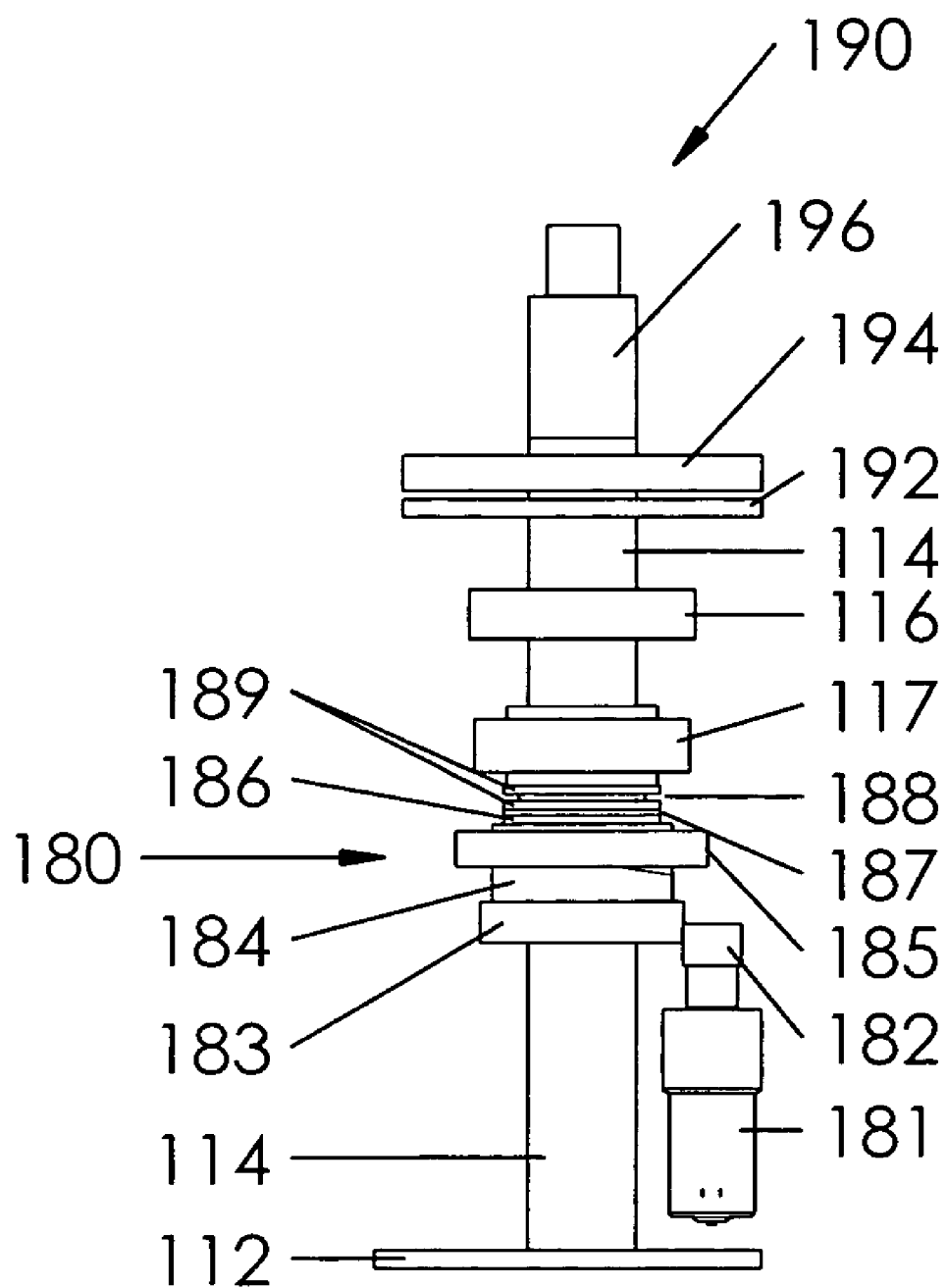
FIG. 9 is a side plan view of one exemplary embodiment of the height adjusting assembly and adjacent components of the dual-wheel self-propelled wheel assembly shown in FIG. 1.

FIG. 9 outlines one exemplary embodiment of the height adjusting assembly 180 and the electrical connections and electronics 190. As shown in FIG. 9, in various exemplary embodiments, the guide shaft 114 is mounted to the lower base plate 112. A combination vertical position motor and gear box 181 has a vertical lift pinion gear 182 attached to its output shaft. The vertical lift pinion gear 182 has gear teeth on its outer surface that meshingly engage with the gear teeth formed in the outer surface of a vertical lift drive gear 183. The vertical lift drive gear 183 is threadingly engaged with a vertical lift screw 184. In various exemplary embodiments, the vertical lift screw 184 sits around, but is able to freely rotate around, the guide shaft 114.

A vertical lift nut 185 is threaded around the vertical lift screw 184 and is connected to a height adjusting plate 119. In various exemplary embodiments, the height adjusting plate 119 is a nut retaining plate to which the vertical lift nut 185 is mounted. In such exemplary embodiments, the vertical position of the vertical lift nut 185 is fixed. Thus, rotation of the vertical lift screw 184 inside the vertical lift nut 185 causes the vertical lift screw 184 to move up or down along the guide shaft 114 relative to the vertical lift nut 185 and the height adjusting plate 119, depending on the direction of the rotation and the direction of the threads on the vertical lift screw and nut 184 and 185. It should be appreciated that, in various exemplary embodiments, the vertical lift screw and nut 184 and 185 use "acme" type threads. Such acme or square threads better support the loads placed on the vertical lift screw and nut 184 and 185. It should also be appreciated that, while acme threads are more useful in this exemplary embodiment, they are not required.

As shown in FIG. 9, a plurality of thrust bearing washers 186 are interspersed with a thrust bearing 187, a compliant load sensorber 188 and a precision washer 189 to form a compliant stack. The load bearing 117 and the centering bearing 116, which are contained within the bearing housing 115 shown in FIGS. 1-4, are also provided around the guide shaft 114. The guide shaft 114 slides inside the centering bearing 116 and the load bearing 117 as the vertical lift screw 184 moves up and down. It should be appreciated that, in various exemplary embodiments, the guide shaft 114, and/or contact surfaces of the vertical lift screw 184, the load bearing 117 and/or the centering bearing 116 are coated with a low-friction or slippery coating, such as Teflon. The guide shaft 114 and/or contact surfaces of the vertical lift screw 184, the load bearing 117 and/or the centering bearing 116 can also be lubricated to provide for mechanical slip on their surfaces.

When the dual-wheel self-propelled wheel assembly 100 is attached to a particular device, such as a pallet, a wheelchair, a pallet jack, a robotics platform or the like, the mounting plate 118 is attached to the attachment surface of the particular device. The device load supported by the dual-wheel, self-propelled wheel assembly 100, which includes the device's mass and the mass of any materials supported by the device, are transferred through the mounting plate 118 and the bearing housing 115 to the load bearing 117 that is mounted around the guide shaft 114. Thus, the load supported by the dual-wheel self-propelled wheel assembly 100 is transferred through the mounting plate 118, the load bearing 117, and the stack comprising the plurality of thrust bearing washers 186, the thrust bearing 187, the compliant load sensorber 188 and the precision washer 189, to the vertical lift screw 184. The load is then transferred from the vertical lift screw 184 to the vertical lift nut 185 and the height adjusting plate 119.

That is, the stack comprising the plurality of thrust bearing washers 186, the thrust bearing 187, the compliant load sensorber 188 and the precision washer 189 are located above the vertical lift screw 184 and are supported by the upper surface of the vertical lift screw 184. The stack comprising the plurality of thrust bearing washers 186, the thrust bearing 187, the compliant load sensorber 188 and the precision washer 189 are located below and support the load bearing 117. Accordingly, as the vertical lift screw 184 moves up and down inside the vertical lift nut 185, the stack comprising the plurality of thrust bearing washers 186, the thrust bearing 187, the compliant load sensorber 188 and the precision washer 189 moves up and down with the vertical lift screw 184. The load bearing 117 moves up and down with the compliant stack. Accordingly, moving the vertical lift screw 184 up and down changes the distance between the vertical lift nut 185 and the load bearing 117.

It should be appreciated that, in various exemplary embodiments, the precision washer 189 is located below the tapered load bearing 117. The precision washer 189 fits loosely over the guide shaft 114 and provides a flat surface between the tapered load bearing 117 and the compliant load sensorber 188. In various exemplary embodiments, the compliant load sensorber 188 is a soft non-metallic commercial O-ring or washer. Typically, O-rings have several advantages over metal springs, such as a compact size, high load ratings, low cost and wide availability. O-rings can be purchased with a wide variety of diameters, thicknesses and materials to provide a compliant interface between load elements.

It should be appreciated that, in various exemplary embodiments, the compliant load sensorber or washer 188 is sized to provide the desired support for the intended load range. The compliant load sensorber 188 typically also has a sufficiently large diameter so that it does not contact the guide shaft 114 when under full compression. It should also be appreciated that, in various exemplary embodiments, the compliant load sensorber or washer 188 provides a cushioning effect for momentary load spikes. In such exemplary embodiments, the compliant load sensorber 188 acts as a spring in a suspension system, with a shock absorbing response from the friction of the guide shaft 114 as it slides inside the centering bearing 116 and the load bearing 117.

The spring rate for the compliant load sensorber 188 can be calibrated to indicate a load on the wheel assembly. This load can be determined by measuring the deflection of the compliant load sensorber 188. As the compliant load sensorber 188 deforms over time, the control electronics 194 can be programmed to correct for this deformation, as well as to generate a signal when it is necessary or desirable to replace the compliant load sensorber 188. A mismatched compliant load sensorber 188 can also be denoted in the control electronics 194.

It should be appreciated that, in various exemplary embodiments, the loose-fit precision thrust bearing washer 186 provides a lower contact surface below the compliant load sensorber 188. This loose-fit precision thrust bearing washer 186 is in contact with the thrust bearing 187, which is also sized and positioned loosely on the guide shaft 114. The thrust bearing 187 allows any rotational forces to be decoupled away from the compliant load sensorber 188, as allowing rotation on the compliant load sensorber 188 could lead to inaccurate measurements and wear. It should be appreciated that, in various exemplary embodiments, another optional loose fit precision thrust bearing washer 186 is located below the thrust bearing 187. This optional loose fit precision thrust bearing washer 186 provides the thrust bearing 187 with a smooth surface to operate from.

The compliant load sensorber 188 and the related thrust bearing 187 transmit the load of the supported device from the tapered load bearing 117 without imparting any direct load forces over the guide shaft 114. These forces are transferred to the vertical lift screw 184 that slides on the outside of the guide shaft 114. The vertical lift nut 185 transfers the supported load through the suspension elements to the tapered load bearing 117. The vertical lift screw 184 is an active load transfer element, in that the load is directly transferred between the vertical lift nut 185 and the threads of the vertical lift screw 184. It should be appreciated that, in various exemplary embodiments, the combination of the suspension elements and the ability to measure the load on the sensorber 188, coupled to the vertical lift system, provides a way to control the load and height as related to an active suspension system. The suspension allows for smother vehicle ride, as bumps and vibrations are reduced. The suspension spring element that forms a load cell can provide feedback signals to the local computer and/or drive the vertical lift screw to react to the changes in the load or to needed height adjustments. Thus, the suspension spring element that forms a load cell, which form an active suspension mode.

Thus, operating the height adjusting assembly 180 allows the relative position between the vertical lift nut 185 and the vertical lift screw 184 to be altered. This alters the overall distance between the vertical lift nut 185 and the tapered load bearing 117, and thus the distance between the mounting plate 118 and the surface on which the dual-wheeled self-propelled wheel assembly 100 rests. By adjusting the relative position of the vertical lift screw 184 to the vertical lift nut 185, and thus the height of the dual-wheel self-propelled wheel assembly 100, the dual-wheel self-propelled wheel assembly 100 can cause the device to which it is mounted to lean, to lift the wheels 140 of the dual-wheel self-propelled wheel assembly 100 and the like. It should be appreciated that, in various exemplary embodiments, the position of the vertical lift nut 185 relative to the height adjusting plate 119 is fixed. In such exemplary embodiments, as the vertical lift screw 184 rotates, the vertical lift screw 184 moves up and down along the guide shaft 114, pushing the stack comprising the plurality of thrust bearing washers 186, the thrust bearing 187, the compliant load sensorber 188 and the precision washer 189, and the tapered load bearing 117 up and down. For this reason, in such exemplary embodiments, the vertical lift pinion gear 182 is not fully meshed with the vertical lift drive gear 183.

It should be appreciated that the gear forces of the orientation pinion gear 174, as it interacts with the stationary steering gear 175, are able to move the entire dual-wheel self-propelled wheel assembly 100 with sufficient torque to counteract any mis-directed wheel torques, such as that occur when one wheel slips, or when a wheel rolls over a small obstacle such as a pencil, a stone, dirt or the like. The wheel motors 120, the orientation motor 150 and the vertical position combined motor/gear box 181 are all mounted on the rotating portion of the dual-wheel self-propelled wheel assembly 100. This rotating portion is the portion that is able to rotate continuously around the stationary steering gear 175. Therefore, some device or structure useable to connect signals and power from the stationary portion of the dual-wheel self-propelled wheel assembly 100 to the rotating portion is desirable. In the exemplary embodiment shown in FIGS. 1-9, since this exemplary embodiment uses only electrical devices, an electrical slip ring is used to connect the signal lines and power lines between these two portions of the dual-wheel self-propelled wheel assembly 100. While optical, fiber optic, radio frequency, and electromagnetic coupling could be used, the low cost and reliability of slip rings makes them a more economical and higher reliability solution.

It should be appreciated that the rotational signal power coupler 196, which is in this exemplary embodiment preferably a slip ring, is positioned at the very top of the dual-wheel self-propelled wheel assembly 100. In the exemplary embodiment shown in FIGS. 1-9, the electronics platform 192 and the control electronics 194 mounted on the electronics platform 192 are positioned directly below the rotational signal power coupler 196. However, it should be appreciated that this is a matter of design choice only. The actual location of the control electronics 194 within the dual-wheel self-propelled wheel assembly 100 is not critical.

Figure 10:
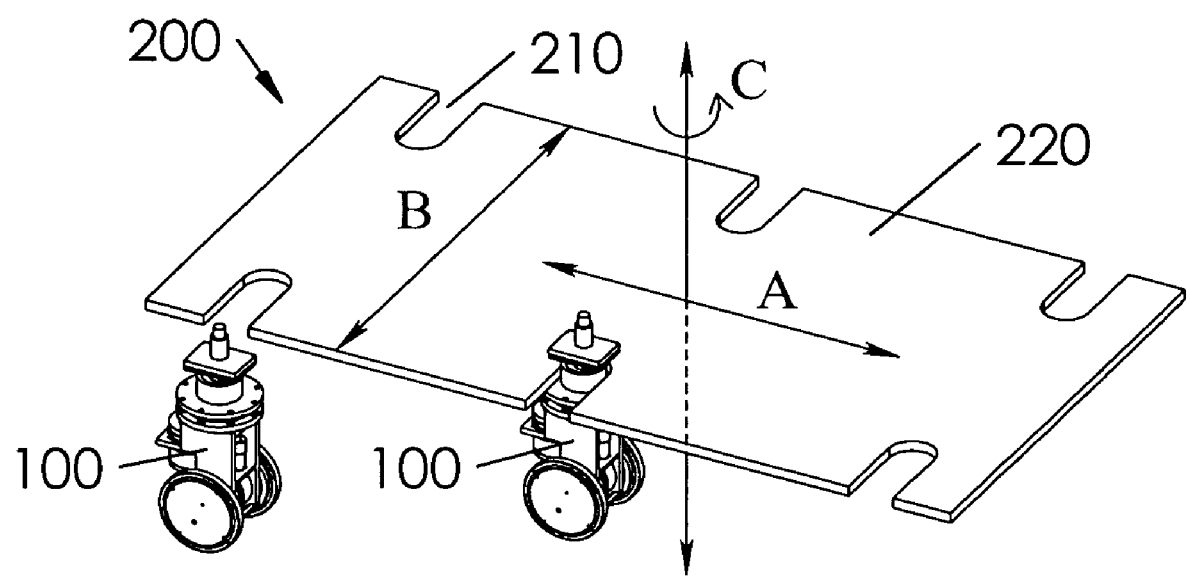
FIG. 10 illustrates one exemplary embodiment of a self-propelled multi-wheel pallet or robotic cart using the dual-wheel self-propelled wheel assembly shown in FIG. 1.

FIG. 10 shows a robotic pallet or cart 200 that can use a number of the dual-wheel self-propelled wheel assemblies 100 according to this invention. As shown in FIG. 10, the robotic pallet or cart 200 includes a pallet surface 220 having a plurality of slots 210 formed in it. As shown in FIG. 10, one dual-wheel self-propelled wheel assembly 100 can be inserted into each of the slots 210 such that the pallet surface 220 rests on the mounting plate 118. By bolting or otherwise attaching the pallet surface 220 to the mounting plate 118, the various dual-wheel self-propelled wheel assemblies 100 can be securely attached to the pallet 200.

It should be appreciated that, by attaching six of the dual-wheel self-propelled wheel assemblies 100 to the pallet 200, that the pallet 200 can be made extremely maneuverable, both laterally and vertically. In particular, by appropriately driving the orientation motor 150, each of the six dual-wheel self-propelled wheel assemblies 100 can individually orient its wheels 140. Thus, if it is desirable to move the pallet 200 forward along a direction A, all of the wheels 140 may be rotated so they are parallel to the direction A before the wheel motors 120 are actuated for forward motion. Alternatively, all of the orientation motors 150 can be actuated so that the wheels 140 are parallel to a direction B. Then, when the wheel motors 120 are actuated for forward motion, the pallet 200, without changing the orientation of the pallet surface 220 in space, can be moved sideways along the direction B.

However, if the orientation of the pallet surface 220 needs to be altered, such as by rotating the pallet 200 about an axis C, various ones of the dual-wheel self-propelled wheel assemblies 100 can be oriented in one direction, while other ones are oriented in other directions to allow the pallet 200 to be rotated or spun about the vertical axis C. That is, each wheel assembly 100 can be oriented at a different angle relative to some reference direction, so that the wheel assemblies 100 are all at appropriate angles, so that, as the pallet 200 pivots around the axis C, all of the wheel assemblies 100 roll around the axis C, and non of the wheel assemblies 100 need to be dragged around the axis C. Of course, any combinations of motions along the direction A, the direction B and the rotational axis C can be implemented using appropriate orientations for the wheels 140 and by dynamically changing the orientation of the wheels 140 as the various six dual-wheel self-propelled wheel assemblies 100 are driven forward or backward by actuating the wheel motors 120.

Figure 11:
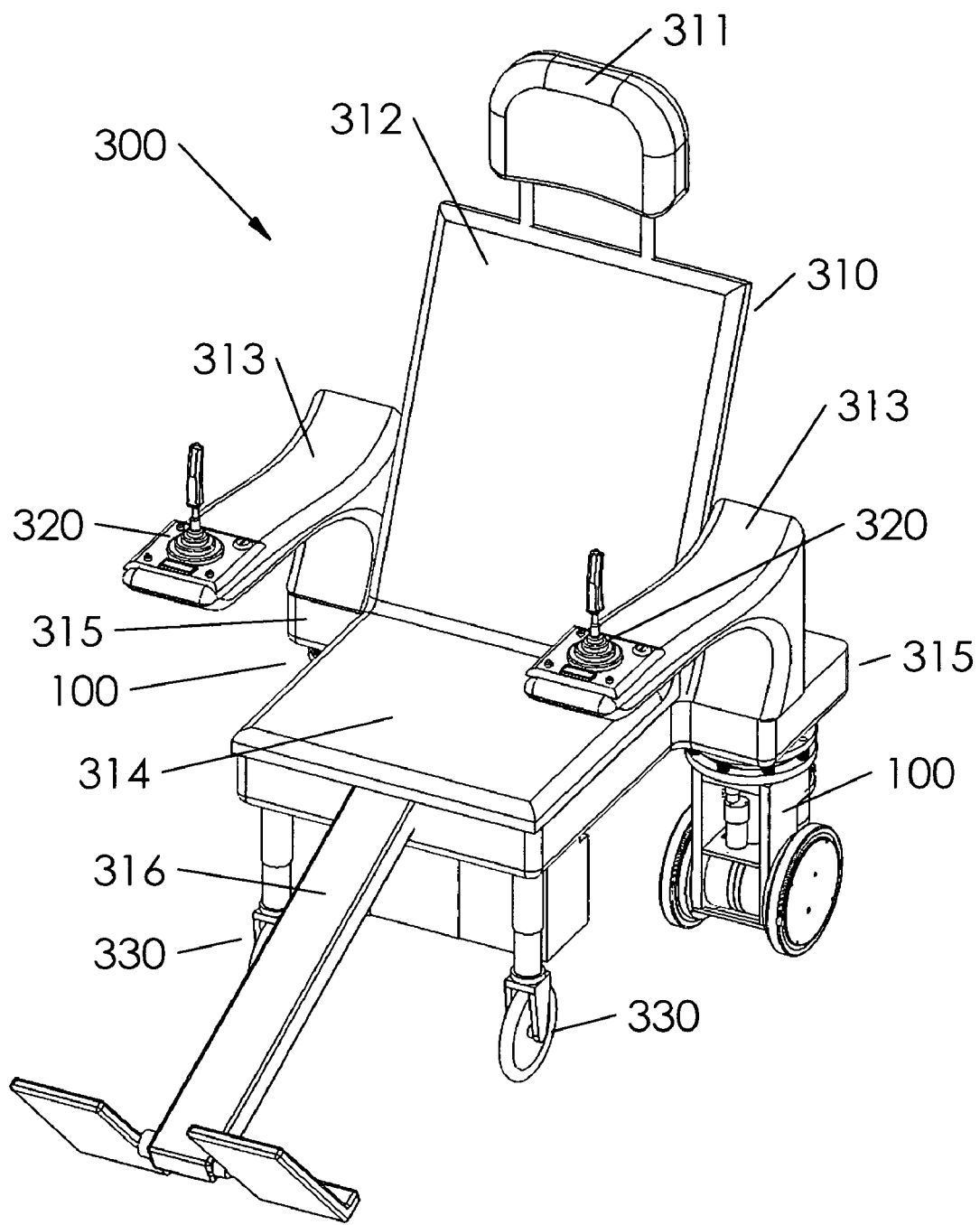
FIG. 11 is a perspective view of one exemplary embodiment of a wheelchair that incorporates a pair of dual-wheel self-propelled wheel assembly shown in FIG. 1.

FIG. 11 illustrates one exemplary embodiment of a self-propelled wheelchair 300 that incorporates a pair of one exemplary embodiment of the dual-wheel, self-propelled wheel assemblies 100 according to this invention. As shown in FIG. 11, the wheelchair 300 includes a body 310, a pair of wheel assembly controllers 320 connected to a pair of the dual-wheel self-propelled wheel assemblies 100 and a pair of casters 330. The wheelchair body 310 includes a headrest 311, a back 312, a pair of armrests 313, a seat 314, a pair of wheel assembly mounting structures 315 and a foot rest 316. In the exemplary embodiment shown in FIG. 11, the pair of wheel assembly controllers 320 are mounted on the arm rests 313, while the dual-wheel self-propelled wheel assemblies 100 are mounted to the wheelchair 300 by securely attaching the mounting plate 118 to the mounting structures 315. By appropriately controlling the orientation of the dual-wheel self-propelled wheel assembly 100, and appropriately controlling the forward or backward rotation of each of the wheels 140 of each dual-wheel self-propelled wheel assemblies 100, the wheelchair 300 can be made to move forward or backwards, sideways, or to spin about an axis extending through the seat 314 and/or the seat back 312. In face, the wheelchair 300 can actually use any axis to rotate about, such as an axis extending through one of the wheel assemblies or even one of the front casters, such that the wheelchair 300 pivots on one of the wheel assemblies, or even on one of the front casters.

Figure 12:
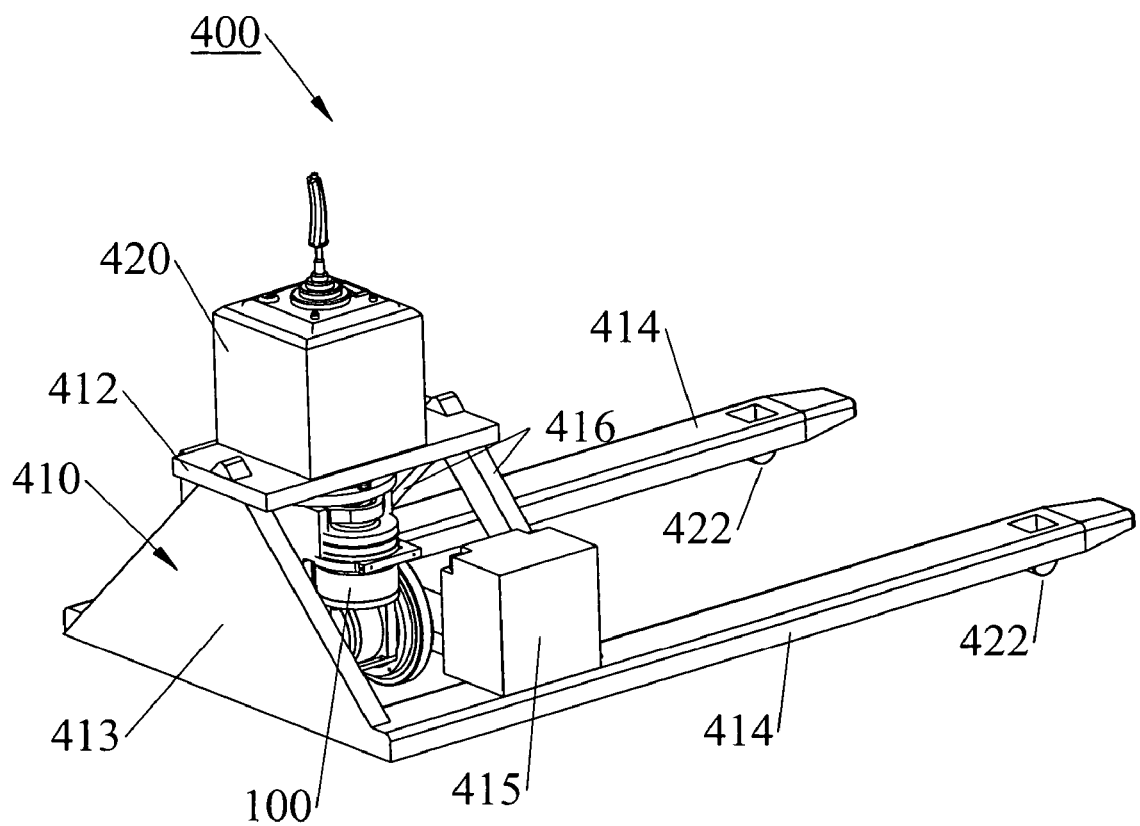
FIG. 12 is a perspective view of one exemplary embodiment of a pallet jack that incorporates the dual-wheel self-propelled wheel assembly shown in FIG. 1.

FIG. 12 shows one exemplary embodiment of a pallet jack 400 that incorporates one exemplary embodiment of a dual-wheel self-propelled wheel assembly 100 according to this invention. As shown in FIG. 12, the pallet jack 400 includes a pallet jack body 410 and a wheel assembly controller 420. The pallet jack body 410 includes a base 412, a back 413, a pair of forks 414, a pair of braces 416 and a pair of batteries 415, although only one battery 415 is shown. By appropriately controlling the dual-wheel self-propelled wheel assembly 100 using the wheel assembly controller 420, the pallet jack 400 can be maneuvered forward and backward, sideways and/or rotated about a desired rotational axis. It should be appreciated that, because the rotational direction and speed of each of the wheel motors 120 can be individually controlled, a rotational axis of the pallet jack 400 can be located anywhere forward of the support member 416 and specifically does not need to be located at the rotational axis of the front fork wheels 422.

Figure 13:
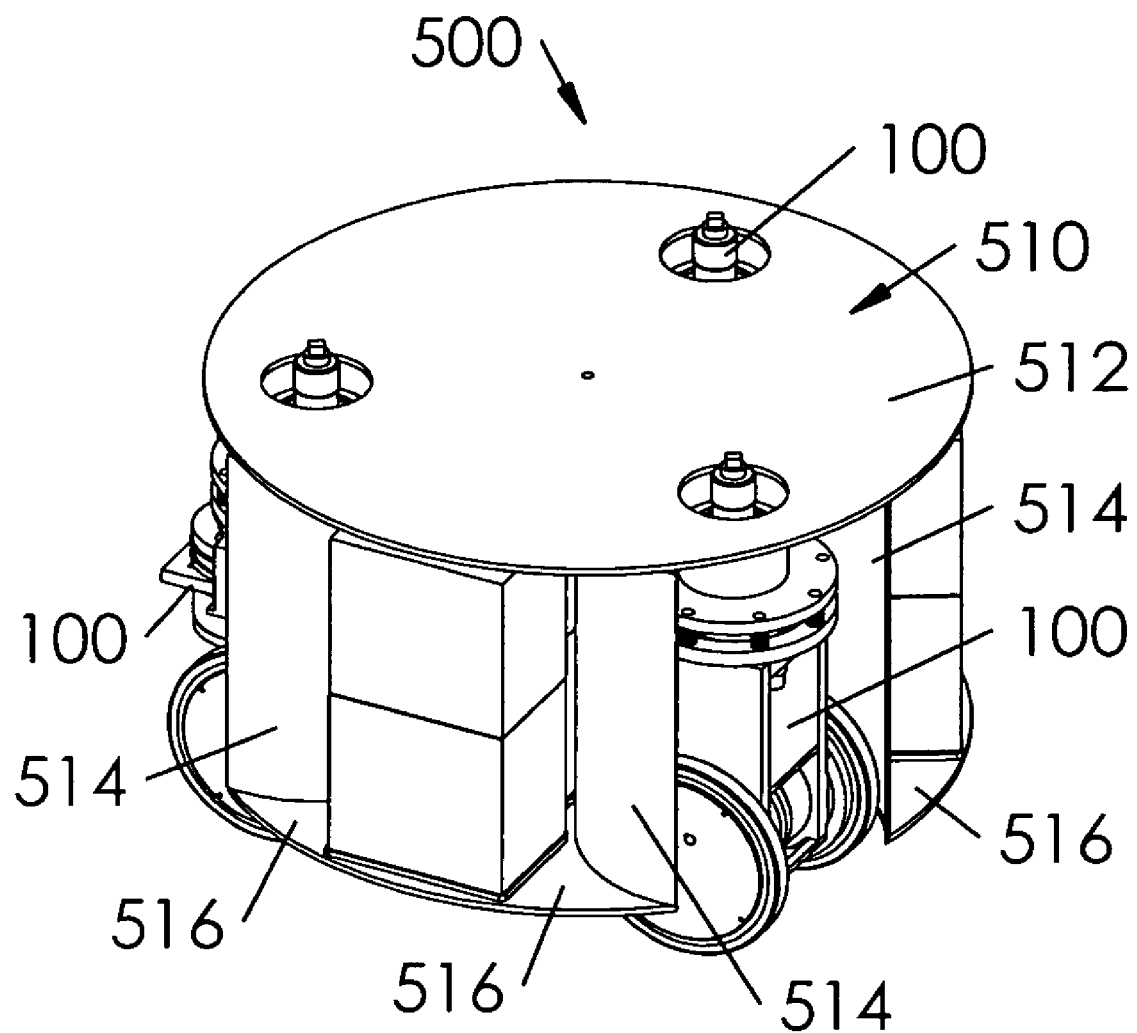
FIG. 13 is a perspective view of one exemplary embodiment of a 3-wheeled mobile robotic platform or robotic cart that incorporates the dual-wheel self-propelled wheel assembly shown in FIG. 1.

FIG. 13 illustrates one exemplary embodiment of a self-propelled robotic cart or platform 500 that can be used to support an mobile robot, one or more robotic arms or any other desired load. As shown in FIG. 13, the self-propelled robotic cart or platform 500 includes three of the dual-wheel self-propelled wheel assemblies 100. As shown in FIG. 13, the robotic cart or platform 500 includes a platform body 510 including a base 512, a wheel skirt 514 and a floor base 516. Typically, the mounting plates 118 of the various dual-wheel self-propelled wheel assemblies 100 would be securely attached to the upper base 512. However, in FIG. 13, the dual-wheel self-propelled wheel assemblies 100 are shown spaced away from the upper base 512 to better illustrate them. It should be appreciated that, in the exemplary embodiment shown in FIG. 13, the electronics platform 192 and the control electronics 194 are not located at the top of the guide shaft 114, as in the previously described exemplary embodiments.

As outlined above, the height adjusting assembly 180 incorporated into each of the dual-wheel self-propelled wheel assemblies 100 allows the distance between the mounting plate 118 and the vertical lift nut 185 to be adjusted. Because the mounting plate 118 is ultimately supported by the vertical lift nut 185, this also causes the distance between the bottom of the tires 148 and the top if the mounting plate 118 to be adjusted. Because the mounting plate 118 is typically mounted to the device incorporating the dual-wheel self-propelled wheel assembly 100, the height of that surface of that device, such as the robotic pallet or cart 200, the wheelchair 300, the pallet jack 400, or the robotic cart or platform 500, can be adjusted. It should be appreciated that each of the robotic pallet or cart 200, the wheelchair 300, the pallet jack 400, and the robotic cart or platform 500 illustrate different uses and advantages of the height adjusting assembly 180. In the following detailed description, reducing the height of the dual-wheel self-propelled wheel assembly 100 refers to reducing the distance between the vertical lift nut 185 and the mounting plate 118, while increasing the height of the dual-wheel self-propelled wheel assembly 100 refers to increasing this distance.

For example, in the robotic pallet or cart 200 shown in FIG. 10, reducing the height of one of the corner dual-wheel self-propelled wheel assemblies 100 will typically not cause the robotic pallet or cart 200 to tip, lean or incline. Rather, this is more likely to raise the tires 148 away from the support surface that the robotic pallet or cart 200 is moving over. This will allow the robotic pallet or cart 200 to maneuver over small barriers in its path, such as door thresholds, thrust offsets in concrete floors, and the like. In this case, each of the various dual-wheel self-propelled wheel assemblies 100 can be reduced in height in turn to "step" over the small barrier in the surface.

If multiple ones of the dual-wheel self-propelled wheel assemblies 100 are progressively reduced in height, the robotic pallet or cart 200 will tilt, lean or incline. This can be useful in several instances. For example, if the small barrier in the floor cannot be "stepped" over but must be rolled over, by adjusting the wheels, the overall height of the robotic pallet or platform, and its load, can be maintained, so that the load does not contact an upper threshold of the doorway or some other structure that may be above it. Likewise, if the load on the pallet is slightly unbalanced, such that its balance can be improved by leaning, tilting or inclining the surface 220 of the robotic pallet or cart 200, this can also be accomplished. Finally, if the compliant load sensorber 188 is used as a load sensor and/or if a tilt sensor or one or more additional load sensors or the like are incorporated into the robotic pallet or platform 200 and appropriately connected to the control system for the dual-wheel self-propelled wheel assemblies 100, the heights of the various dual-wheel self-propelled wheel assemblies 100 can be dynamically adjusted, based on sensed tilts of the pallet surface 200 and/or the loads on the dual-wheel, self-propelled wheel assemblies 100, to reduce, or ideally eliminate, such tilts or inclines and/or balance such loads, so that the load on the robotic pallet or cart 200 is not unbalanced and otherwise does not slide off the robotic pallet or cart 200.

Similarly, the heights of the dual-wheel self-propelled wheel assemblies 100 attached to the wheelchair 300 can also be adjusted to modify the tilt, lean or incline of the seat 314, to allow the wheelchair 300 to crossover small barriers, such as door thresholds and the like, similarly to the robotic pallet or platform 200. Because each user of a wheelchair 300 that incorporates the dual-wheel self-propelled wheel assemblies 100 will have a different use for the wheelchair 300, and will come to the wheelchair 300 with a different disability, providing a particular tilt, lean or incline to the wheel chair 300 may make the user more comfortable and/or may make it easier or less awkward for the user to interact with his or her environment.

As outlined above, the pallet jack 400 includes only a single one of the dual-wheel self-propelled wheel assemblies 100. Thus, the ability of the pallet jack 400 to lean and/or tilt in any direction is significantly constrained. Nevertheless, adjusting the height of the dual-wheel self-propelled wheel assembly 100 incorporated into the pallet jack 400 allows the operator of the pallet jack to selectively engage and disengage with a pallet or other load to be engaged, moved and/or relocated using the pallet jack 400.

The self-propelled robotic cart or platform 500 includes three of the dual-wheel self-propelled wheel assemblies 100, as three points allow a plane to be defined. Accordingly, by appropriately raising and lowering the height adjusting assembly 180 of each of the three dual-wheel self-propelled wheel assemblies 100, the orientation of the self-propelled platform 500 can be altered so that it is inclined, slanted or tipped. Additionally, it should be appreciated that a sensorber 188 can measure the load experienced by the wheel assembly 100 of which it is a part. In response, the vertical lift motor 181 can move the vertical load nut 185 up and down along the vertical lift screw 184, which can shift the load and/or adjust the load that each wheel assembly 100 experiences. Thus, a mobile vehicle were operating on a soft floor, such as one made of vinyl, this feature could be used to make sure that no one wheel assembly 100 placed too much force in one spot, which could dent the floor or cause other damage.

It should further be appreciated that in various exemplary embodiments, the dual-wheel self-wheel assemblies 100 according to this invention have 4 degrees of freedom, corresponding to the two drive motors 120, the orientation motor 150 and the height adjusting motor/gear box 181. Furthermore, as outlined above, because each of the drive motors 120 can be independently operated in both forward and backward directions and at different rates of rotation, any individual dual-wheel self-propelled wheel assembly 100 can be made to rotate around any desired point in space. That is, the dual-wheel self-propelled wheel assembly 100 is not constrained to rotate around the rotational axis of the guide shaft 114 or a particular point of contact of the tires 148 on the support surface. Rather, for any desired point in space, that point in space can be made into a virtual axis of rotation by altering the orientation of the dual-wheel self-propelled wheel assembly 100. By appropriately setting the rotational directions and speeds of the two wheels 140 based on their differing radial distances from the desired point in space, the dual-wheel self-propelled wheel assembly 100 will travel along a circular path relative to that desired point in space. Thus, for example, the pallet jack 400, which includes a single one of the dual-wheel self-propelled wheel assembly 100, can not be made to rotate around any virtual axis located at any point in space, as this motion is constrained by the other fixed wheels. However, it can rotate about any point using one or both of the fixed wheels as a reference.

For mobile devices that include a plurality of the dual-wheel self-propelled wheel assemblies 100, and no fixed non-steerable wheels, such as the robotic pallet or the robotic cart 200, the wheelchair 300, and/or the robotic platform or cart 500, each of the various dual-wheel self-propelled wheel assemblies 100 can be individually oriented and the two wheel motors 120 and/or the orientation motor 150 of the various dual-wheel self-propelled wheel assemblies 100 are individually actuated or energized depending on the distance of each of the wheels 140 of that dual-wheel self-propelled wheel assembly 100 from the desired virtual axis of rotation. Any axis of rotation can be used for these mobile devices. The mobile device can use any axis of rotation ranging from about a single wheel of a dual-wheel assembly 100, to a point located anywhere inside the mobile device, to a point located anywhere outside the mobile device. (In contrast, synchro drive-type robots use a gear train, belts or the like to keep all the wheels pointed the same direction. Thus, synchro drive-type robots cannot pivot about an axis and can only have a limited ability to steer to simulate rotation or pivoting about an axis.

It should also be appreciated that each of the wheel motors 120, the orientation motor 150 and the height adjusting motor and gear box 181 can be provided with incremental and/or absolute position encoders such that position information can be provided to either an onboard controller contained in the control electronics 194 and/or to a centralized controller via the rotational signal power coupler 196. In particular, incremental position encoders would be appropriate for the wheels 140, as it is generally only necessary to know the incremental movement of the wheels 140 since the last position reading. In contrast, the steering motor 150 could use an absolute encoder, as it is often desirable to know the absolute position of the lower portion of the dual-wheel self-propelled wheel assembly 100 relative to the upper portion of the dual-wheel self-propelled wheel assembly 100 that is attached to the particular mobile device or structure. Likewise, the height adjusting motor and gear box 181 should include an absolute encoder that indicates the absolute height of the height adjusting plate 119 above the lower base plate 112.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A modular dual-wheel assembly for a small scale machine, comprising:
    a frame; and
    a pair of wheel assemblies, each wheel assembly connected to the frame and comprising:
        a wheel drive motor having an output shaft
        a wheel at least indirectly connected to the output shaft, the wheel rotatingly driven by the wheel drive motor around a rotational axis, and
        a wheel gear assembly that indirectly connects the wheel to the output shaft, the wheel gear assembly transmitting rotational motion from the output shaft of the wheel drive motor to the wheel and provided substantially within an internal volume of the wheel;
    wherein the rotational axis of each wheel assembly is collinear with the rotational axis of the other wheel assembly and each wheel assembly is controllably operable independently of the other wheel assembly such that the frame is rotatable around a pivot axis that is locatable anywhere on a common line of the collinear rotational axes;
    a hypocyclic cam having at least one cam lobe;
    at least one set of hypocyclic gears, each set comprising an inner hypocyclic gear and an outer hypocyclic gear; and
    a gear hub cap connected to the at least one inner hypocyclic gear and the wheel, the gear hub cap transmitting rotational motion of the inner hypocyclic gear to the wheel;
    a load bearing mounted around the outside of the at least one hypocyclic outer gear;
    a rim mounted on the outside of the load bearing;
    a tire mounted to the rim; and
    a load bearing retainer that maintains the load bearing in a desired position relative to the at least one outer hypocyclic gear, the load bearing retainer at least indirectly connected to the frame.

2. The dual-wheel assembly of claim 1, wherein each hypocyclic outer gear is at least indirectly connected to the frame.

3. A modular dual-wheel assembly for a small scale machine, comprising:
    a frame; and
    a pair of wheel assemblies, each wheel assembly connected to the frame and comprising:
        a wheel drive motor having an output shaft
        a wheel at least indirectly connected to the output shaft, the wheel rotatingly driven by the wheel drive motor around a rotational axis, and
        a wheel gear assembly that indirectly connects the wheel to the output shaft, the wheel gear assembly transmitting rotational motion from the output shaft of the wheel drive motor to the wheel and provided substantially within an internal volume of the wheel;

wherein the rotational axis of each wheel assembly is collinear with the rotational axis of the other wheel assembly and each wheel assembly is controllably operable independently of the other wheel assembly such that the frame is rotatable around a pivot axis that is locatable anywhere on a common line of the collinear rotational axes;

a hypocyclic cam having at least one cam lobe;

at least one set of hypocyclic gears, each set comprising an inner hypocyclic gear and an outer hypocyclic gear; and a gear hub cap connected to the at least one inner hypocyclic gear and the wheel, the gear hub cap transmitting rotational motion of the inner hypocyclic gear to the wheel;

each inner hypocyclic gear is mounted around a corresponding cam lobe of the hypocyclic cam; and the gear hub cap is connected to the at least one inner hypocyclic gear by at least a pair of drive torque pins that are attached to the gear hub cap and that extend into corresponding voids formed in the at least one inner hypocyclic gear.

4. The dual-wheel assembly of claim 3, wherein:

each at least one set of hypocyclic gears further comprises a hypocyclic cam bearing;

for each at least one set of hypocyclic gears, the hypocyclic cam bearing of that set is mounted on a corresponding one of the at least one cam lobes; and the inner hypocyclic gear of that set is mounted on the hypocyclic cam bearing of that set.

5. A dual-wheel assembly, comprising:

a frame;

a pair of wheel assemblies, each wheel assembly connected to the frame and comprising:
 a wheel drive motor having an output shaft,
 a wheel at least indirectly connected to the output shaft, the wheel rotatingly driven by the wheel drive motor, and
 a wheel gear assembly that indirectly connects the wheel to the output shaft, the wheel gear assembly transmitting rotational motion from the output shaft of the wheel drive motor to the wheel and provided substantially within an internal volume of the wheel;

an orientation motor connected to the frame and having an output shaft; and an orientation steering assembly at least indirectly driven by the orientation motor;

wherein each wheel assembly is controllably operable independently of the other wheel assembly and the orientation motor is controllably operable to alter a relative position of the orientation steering assembly to the frame;

a first gear element is rotatingly driven by the orientation motor;

the orientation steering assembly comprises a second gear element; and the first gear element is meshingly engaged within the second gear element;

wherein the first gear element is mounted on the output shaft of the orientation motor;

wherein the dual-wheel assembly further comprises an orientation drive gear assembly that transmits rotational motion from the output shaft of the orientation motor to the first gear element;

a hypocyclic cam having at least one cam lobe;

at least one set of hypocyclic gears, each set comprising an inner hypocyclic gear and an outer hypocyclic gear; and a drive mount that connects the orientation motor to the frame;

wherein the orientation steering assembly comprises:
 a hypocyclic drive hub connected to the at least one inner hypocyclic gear,
 at least one orientation bearing positioned around the hypocyclic drive hub, and
 an orientation bearing retainer positioned around the at least one orientation bearing and connected to the at least one outer hypocyclic gear;

the first gear element is attached to a free end of the hypocyclic drive hub; and the hypocyclic drive hub transmits rotational motion of the inner hypocyclic gear to the first gear element.

6. The dual-wheel assembly of claim 5, wherein the second gear element is at least indirectly rotationally connected to the frame.

7. The dual-wheel assembly of claim 6, further comprising:

a guide shaft connected to the frame; and a mounting plate rotationally supported on the guide shaft, the mounting plate connectable to at least one of a device to be supported and a load to be supported, such that the mounting plate does not rotate relative to the device or load;

wherein the second gear element is at least indirectly connected to the mounting plate such that the second gear element does not rotate relative to the mounting plate.

8. The dual-wheel assembly of claim 7, wherein:

when the orientation motor is energized to rotate the output shaft, rotation of the output shaft causes rotation of the first gear; and rotation of the first gear element causes the frame to rotate around the guide shaft relative to the second gear element.

9. A dual-wheel assembly, comprising:

a frame;

a pair of wheel assemblies, each wheel assembly connected to the frame and comprising:
 a wheel drive motor having an output shaft,
 a wheel at least indirectly connected to the output shaft, the wheel rotatingly driven by the wheel drive motor, and
 a wheel gear assembly that indirectly connects the wheel to the output shaft, the wheel gear assembly transmitting rotational motion from the output shaft of the wheel drive motor to the wheel and provided substantially within an internal volume of the wheel;

an orientation motor connected to the frame and having an output shaft; and an orientation steering assembly at least indirectly driven by the orientation motor;

wherein each wheel assembly is controllably operable independently of the other wheel assembly and the orientation motor is controllably operable to alter a relative position of the orientation steering assembly to the frame;

a first gear element is rotatingly driven by the orientation motor;

the orientation steering assembly comprises a second gear element; and the first gear element is meshingly engaged within the second gear element;

wherein the first gear element is mounted on the output shaft of the orientation motor;

wherein the dual-wheel assembly further comprises an orientation drive gear assembly that transmits rotational motion from the output shaft of the orientation motor to the first gear element;
a hypocyclic cam having at least one cam lobe;
at least one set of hypocyclic gears, each set comprising an inner hypocyclic gear and an outer hypocyclic gear; and
a drive mount that connects the orientation motor to the frame;
wherein each inner hypocyclic gear is mounted around a corresponding cam lobe of the hypocyclic cam; and
the hypocyclic drive hub is connected to the at least one inner hypocyclic gear by at least a pair of drive torque pins that are attached to the hypocyclic drive hub and that extend into corresponding voids formed in the at least one inner hypocyclic gear.

10. The dual-wheel assembly of claim 9, wherein:
each at least one set of hypocyclic gears further comprises a hypocyclic cam bearing:
the hypocyclic cam bearing of each set is mounted on a corresponding one of the at least one cam lobes; and
for each set, the inner hypocyclic gear of that set is mounted on the hypocyclic cam bearing of that set.

11. A modular dual-wheel assembly for a small scale machine, comprising:
a frame; and
a pair of wheel assemblies, each wheel assembly connected to the frame and comprising:
a wheel drive motor having an output shaft
a wheel at least indirectly connected to the output shaft, the wheel rotatingly driven by the wheel drive motor around a rotational axis, and
a wheel gear assembly that indirectly connects the wheel to the output shaft, the wheel gear assembly transmitting rotational motion from the output shaft of the wheel drive motor to the wheel and provided substantially within an internal volume of the wheel;
wherein the rotational axis of each wheel assembly is collinear with the rotational axis of the other wheel assembly and each wheel assembly is controllably operable independently of the other wheel assembly such that the frame is rotatable around a pivot axis that is locatable anywhere on a common line of the collinear rotational axes;
a guide shaft connected to the frame;
a height adjusting assembly;
at least one bearing positioned around and rotatable relative to the guide shaft, the at least one bearing supported by the height adjusting assembly;
a bearing housing positioned around the at least one bearing and rotatable relative to the guide shaft; and
a mounting plate positioned around and rotatable relative to the guide shaft, the mounting plate attached to the bearing housing and connectable to at least one of a device to be supported and a load to be supported such that the mounting plate does not rotate relative to the device or load;
wherein, operating the height adjusting assembly alters a distance between the mounting plate and the frame.

12. The dual-wheel assembly of claim 11, wherein the height adjusting assembly comprises:
a height adjusting motor assembly having an output shaft;
a drive gear mounted on the output shaft;
a vertical lift screw positioned around and rotatable relative to the guide shaft, the vertical lift screw meshingly engaged with the drive gear;
a vertical lift nut positioned around and threadingly engaged with the vertical lift screw and at least indirectly connected to the frame; and
a suspension assembly positioned around and rotatable relative to the guide shaft, the suspension assembly supported by the vertical lift screw.

13. The dual-wheel assembly of claim 12, wherein the at least one bearing that is supported by the height adjusting assembly is supported by the suspension assembly of the height adjusting assembly.

14. The dual-wheel assembly of claim 12, wherein the height adjusting motor assembly includes:
a motor; and
at least one gear between the motor and the output shaft.

15. The dual-wheel assembly of claim 11, further comprising:
a mounting plate connectable to at least one of a device to be supported and a load to be supported such that the mounting plate does not rotate relative to the device or load; and
a guide shaft connected to the frame, wherein the mounting plate is positioned around the guide shaft, the guide shaft rotatable relative to the mounting plate; and
wherein the two wheel assemblies can be controllably operated together such that each wheel assembly rotates in a same relative direction around the rotational axis for that wheel assembly, such that the pivot axis is located at a point outside of the two wheel assemblies.

16. The dual-wheel assembly of claim 11, further comprising:
a mounting plate connectable to at least one of a device to be supported and a load to be supported such that the mounting plate does not rotate relative to the device or load; and
a guide shaft connected to the frame, wherein the mounting plate is positioned around the guide shaft, the guide shaft rotatable relative to the mounting plate; and
wherein the two wheel assemblies can be controllably operated together such that each wheel assembly rotates in a different relative direction around the rotational axis for that wheel assembly than the other wheel assembly, such that the pivot axis is located between the two wheel assemblies.

17. The dual-wheel assembly of claim 11, further comprising:
a mounting plate connectable to at least one of a device to be supported and a load to be supported such that the mounting plate does not rotate relative to the device or load; and
a guide shaft connected to the frame, wherein the mounting plate is positioned around the guide shaft, the guide shaft rotatable relative to the mounting plate; and
wherein the frame can pivot relative to the mounting plate about an axis defined by the guide shaft over 360 degrees of rotation.

18. The dual-wheel assembly of claim 11, wherein each wheel assembly utilizes an axle-less hub to translate rotational movement from the corresponding wheel drive motor to the wheel.

19. The dual-wheel assembly of claim 11, wherein each wheel drive motor is an electric motor and each electrical motor is controllable to provide absolute positioning of the wheel.

20. A modular dual-wheel assembly for a small scale machine, comprising:
a frame;

a pair of wheel assemblies, each wheel assembly connected to the frame and comprising:
- a wheel drive motor having an output shaft,
- a wheel at least indirectly connected to the output shaft, the wheel rotatingly driven by the wheel drive motor around a rotational axis, and
- a wheel gear assembly that indirectly connects the wheel to the output shaft, the wheel gear assembly provided substantially within an internal volume of the wheel and transmitting rotational motion from the output shaft of the wheel drive motor to the wheel, wherein the rotational axis of each wheel assembly is collinear with the rotational axis of the other wheel assembly and each wheel assembly is controllably operable independently of the other wheel assembly to rotate the modular pair of wheel assemblies around a pivot axis that is locatable anywhere on a common line of the collinear axes;

an orientation motor connected to the frame and having an output shaft;

an orientation steering assembly at least indirectly driven by the orientation motor, wherein the orientation motor is controllably operable to alter a relative position of the orientation steering assembly to the frame;

a guide shaft connected to the frame;

a height adjusting assembly;

at least one bearing positioned around and rotatable relative to the guide shaft, the at least one bearing supported by the height adjusting assembly;

a bearing housing positioned around the at least one bearing and rotatable relative to the guide shaft, and a mounting plate positioned around and rotatable relative to the guide shaft, the mounting plate attached to the bearing housing and connectable to at least one of a device to be supported and a load to be supported such that the mounting plate does not rotate relative to the device or load, wherein operating the height adjusting assembly alters a distance between the mounting plate and the frame.

* * * * *